(12) United States Patent
Rong

(10) Patent No.: US 10,667,492 B1
(45) Date of Patent: *Jun. 2, 2020

(54) PET WASTE COLLECTOR BAG

(71) Applicant: Kebin Rong, Alhambra, CA (US)

(72) Inventor: Kebin Rong, Alhambra, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,776

(22) Filed: Jan. 6, 2019

(51) Int. Cl.
*A01K 23/00* (2006.01)

(52) U.S. Cl.
CPC .................. *A01K 23/005* (2013.01)

(58) Field of Classification Search
CPC .... A41D 13/08; A41D 13/081; A41D 19/015; A41D 19/0055; A41D 19/01505; A41D 2600/20; A61B 19/04; E01H 1/1206; A01K 23/005; A01K 1/0107; A61F 13/105
USPC .............................. 2/16, 20, 59, 161.6, 161.7
See application file for complete search history.

(56) References Cited

U.S. PATENT DOCUMENTS

| | | | | |
|---|---|---|---|---|
| 4,788,733 A | * | 12/1988 | Lerner | A41D 19/0075 15/104.94 |
| 5,222,777 A | * | 6/1993 | Clonch | E01H 1/1206 294/1.3 |
| 7,216,905 B1 | * | 5/2007 | Armes, Jr. | E01H 1/1206 294/1.3 |
| 9,469,950 B1 | * | 10/2016 | Rong | E01H 1/1206 |
| 9,771,697 B2 | * | 9/2017 | Rong | E01H 1/1206 |
| 9,951,489 B2 | * | 4/2018 | Rong | E01H 1/1206 |
| 2009/0315350 A1 | * | 12/2009 | Allen | E01H 1/1206 294/1.3 |
| 2010/0084880 A1 | * | 4/2010 | Avilez | E01H 1/1206 294/1.3 |
| 2010/0176611 A1 | * | 7/2010 | Merino-Garcia | E01H 1/1206 294/1.3 |
| 2011/0210571 A1 | * | 9/2011 | Dan | A41D 19/0024 294/1.3 |

* cited by examiner

*Primary Examiner* — Stephen A Vu
(74) *Attorney, Agent, or Firm* — Raymond Y. Chan; David and Raymond Patent Firm

(57) ABSTRACT

A pet waste collector bag for coupling with two scraper arms for picking up the pet waste includes a bag body and a retaining arrangement coupled to the bag body for retaining the two scraper arms so as to scrape the pet waste into the bag body without needing the scraper arms to touch the pet waste and the hands of the pet owner will not have contact with the pet waste during the pet waste picking operation.

16 Claims, 21 Drawing Sheets

A-A

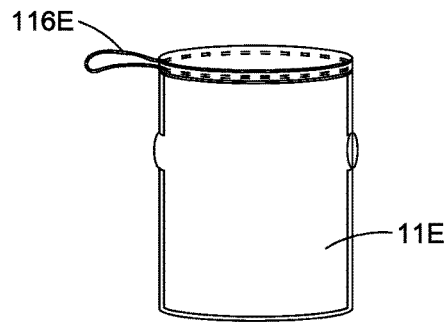
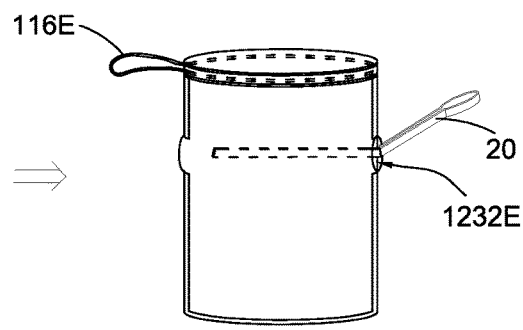
FIG.10A    FIG.10B
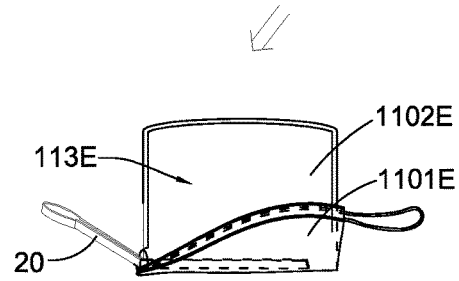
FIG.10C
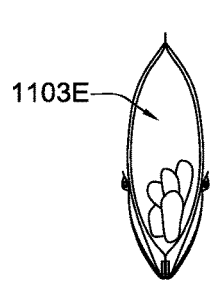 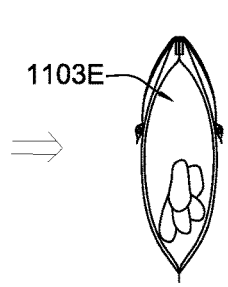 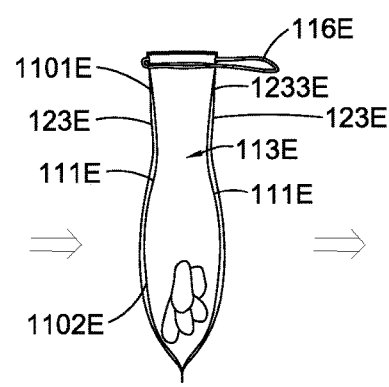 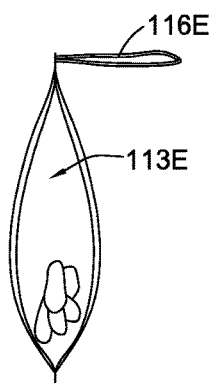
FIG.10D    FIG.10E    FIG.10F    FIG.10G

B-B

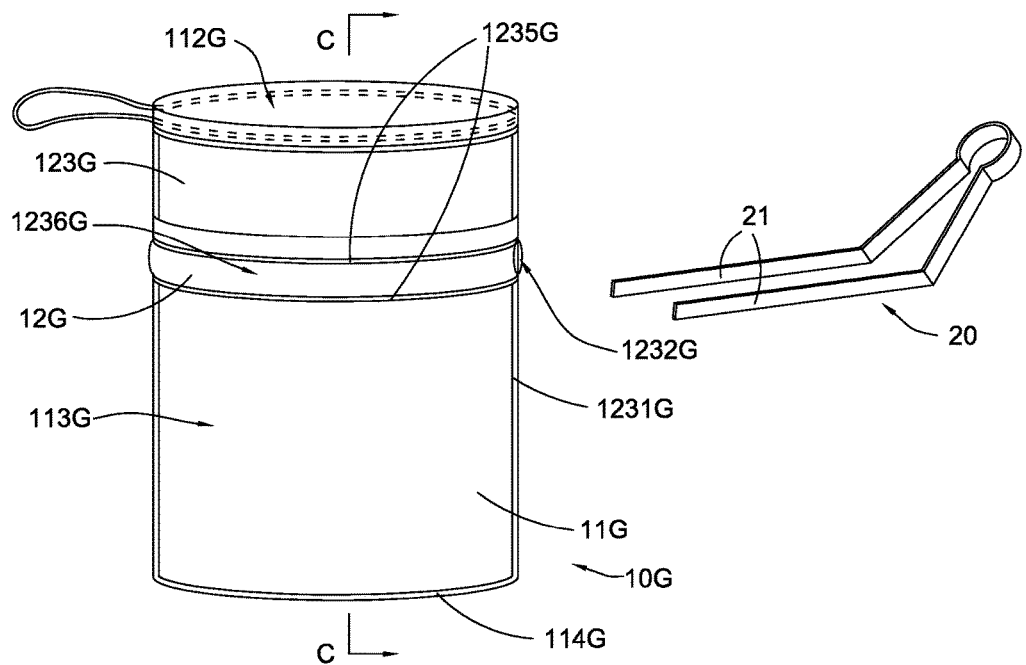
FIG.13A
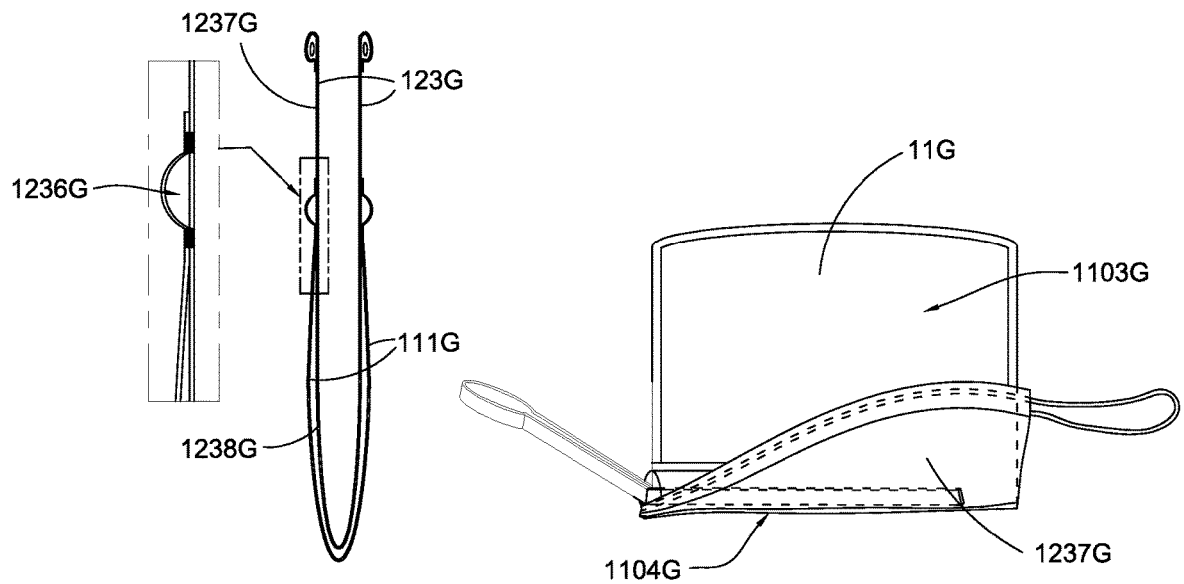
C-C
FIG.13B
FIG.14

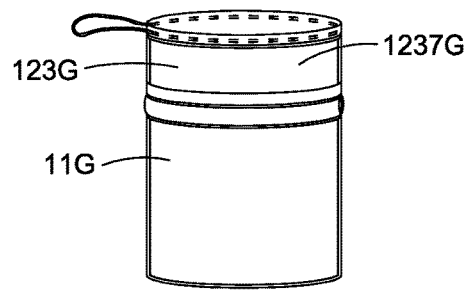
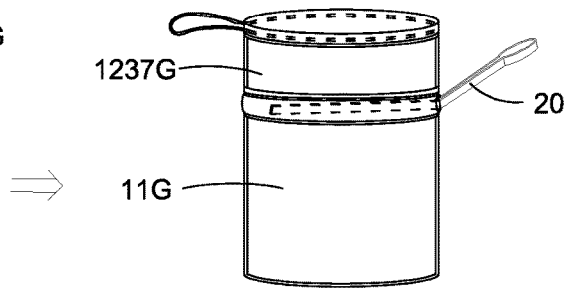
FIG.15A          FIG.15B
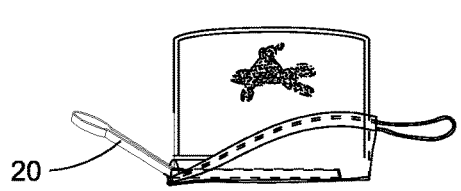
FIG.15C
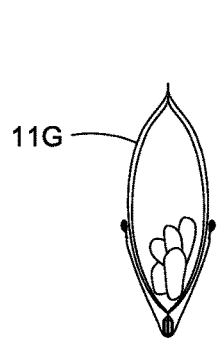 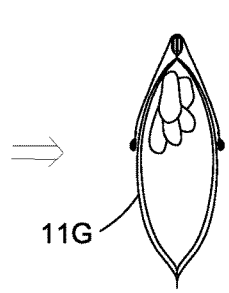 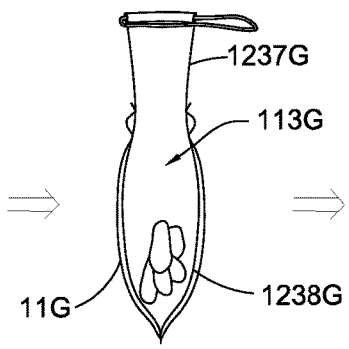 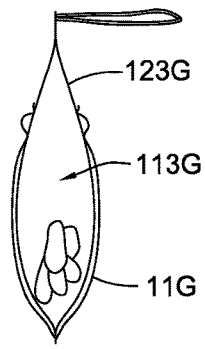
FIG.15D    FIG.15E    FIG.15F    FIG.15G

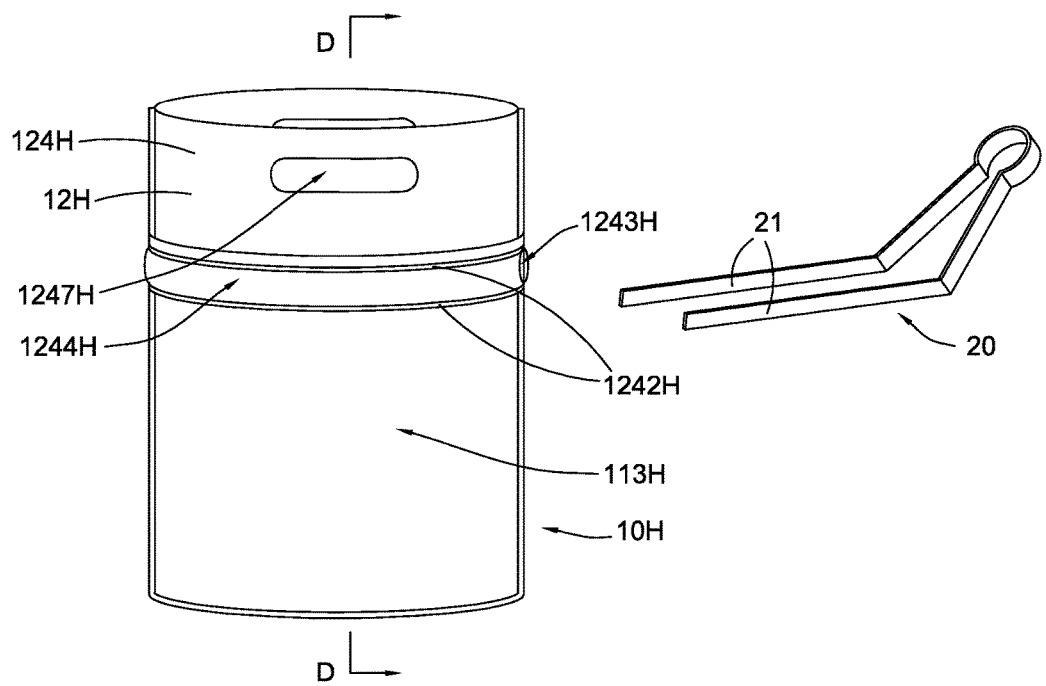
FIG.16A
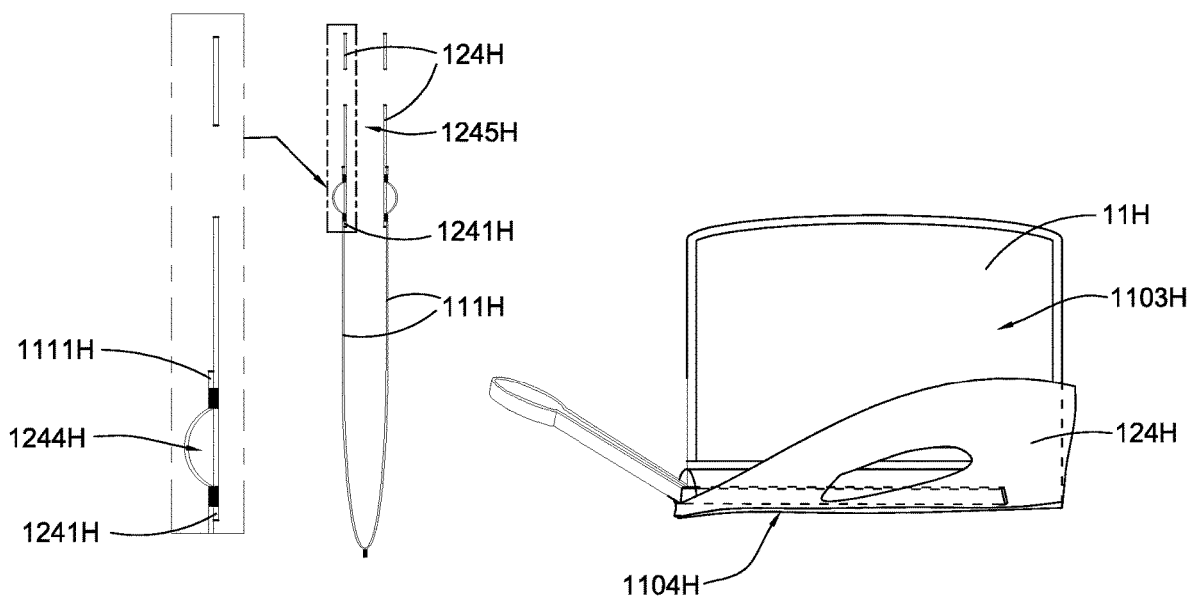
D-D
FIG.16B
FIG.17

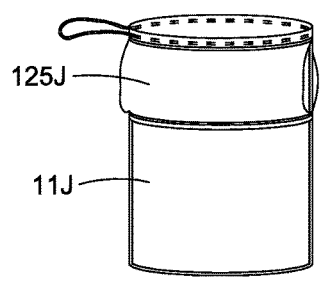
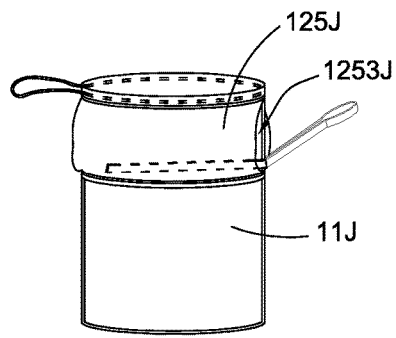
FIG.22A          FIG.22B
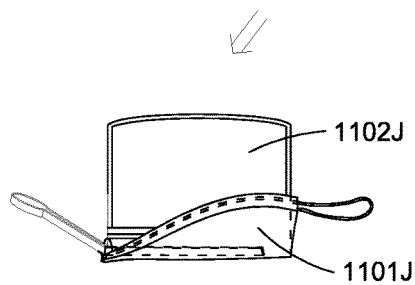
FIG.22C
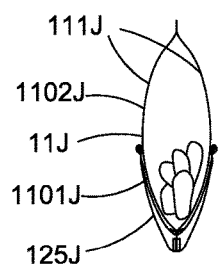
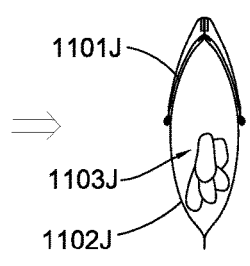
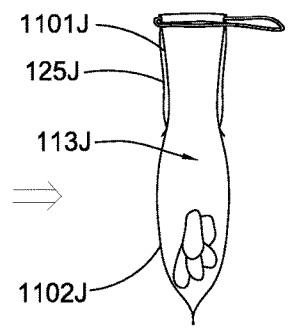
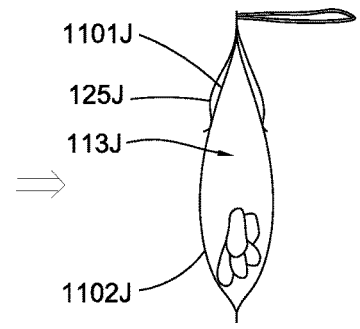
FIG.22D    FIG.22E    FIG.22F    FIG.22G

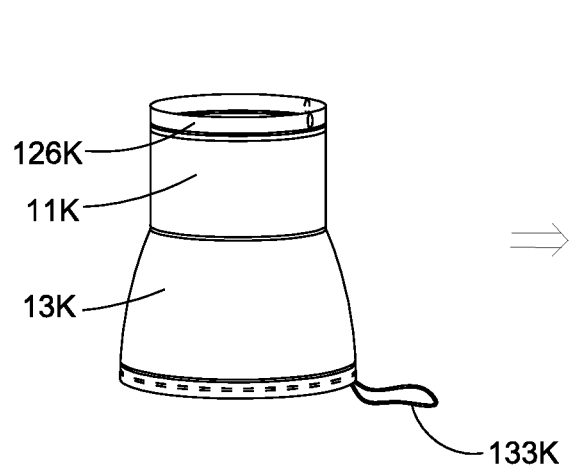
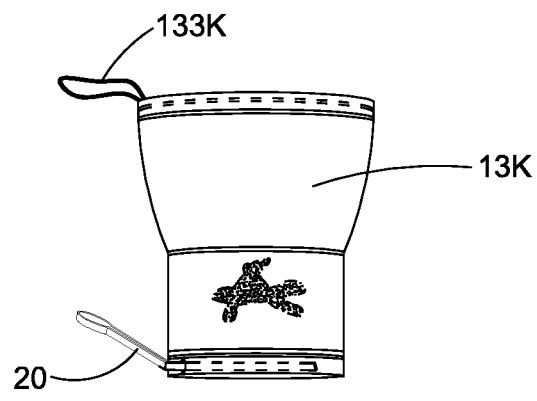
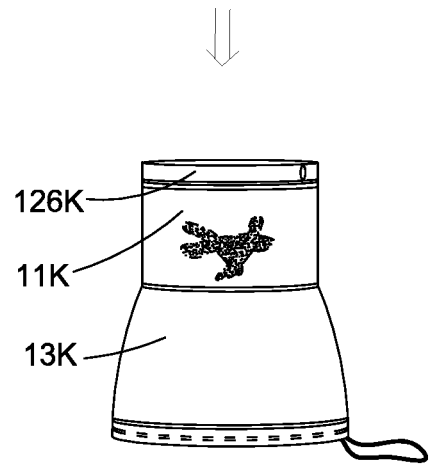
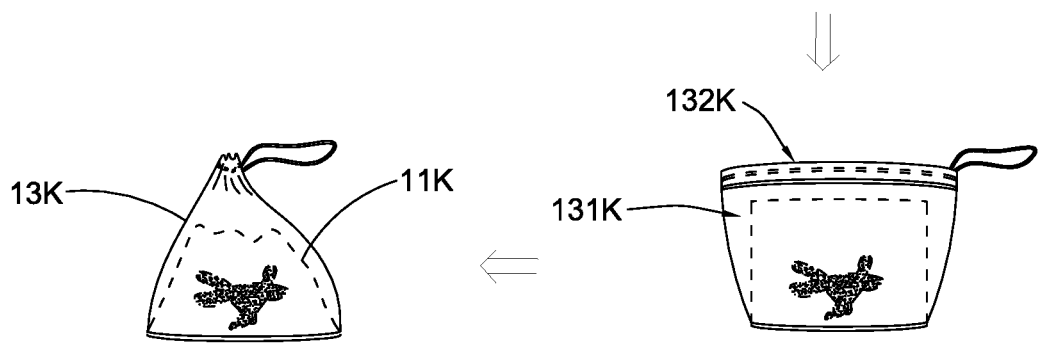
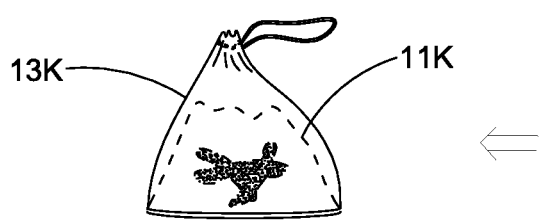
FIG.25A
FIG.25B
FIG.25C
FIG.25D
FIG.25E

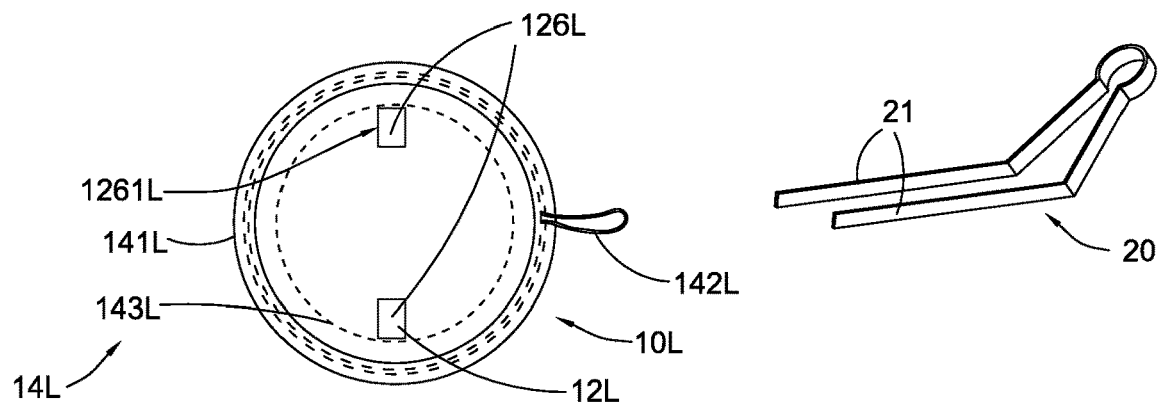
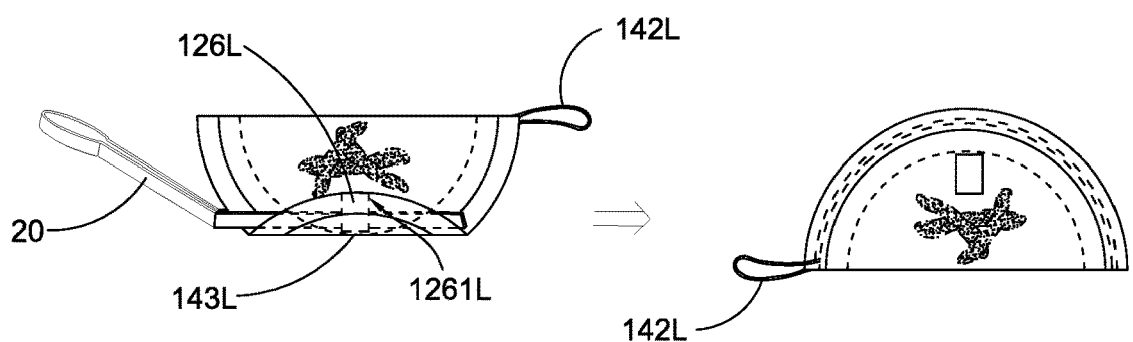
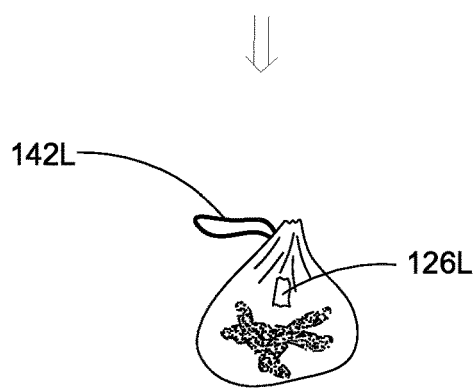
FIG.26
FIG.27A    FIG.27B
FIG.27C

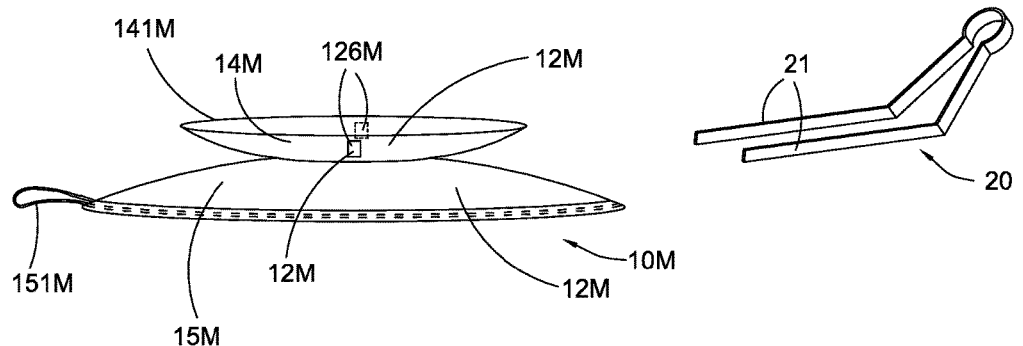
FIG.28
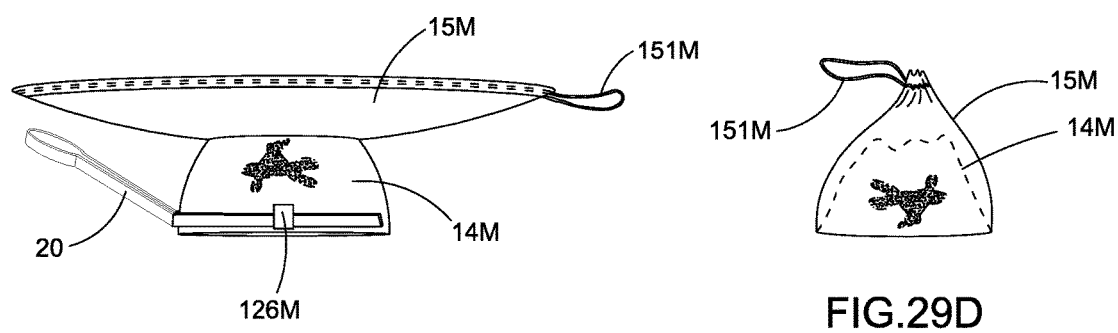
FIG.29A
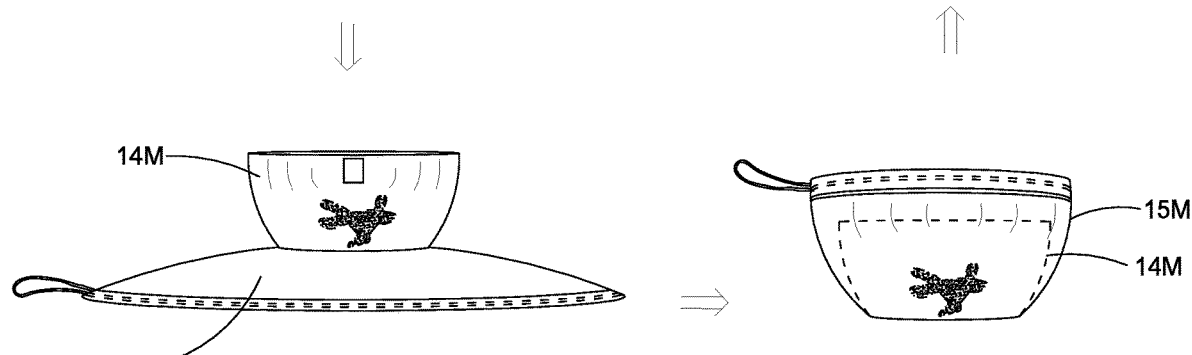
FIG.29B
FIG.29C
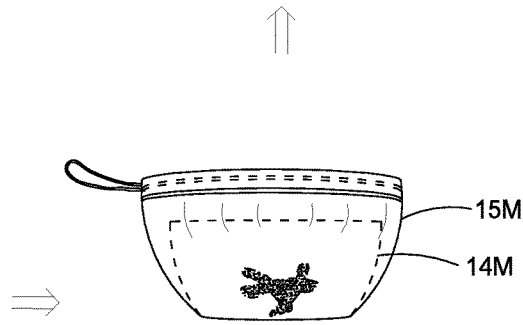
FIG.29D

PET WASTE COLLECTOR BAG

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a waste bag, and more particular to a pet waste collector bag which includes a retaining arrangement adapted for positioning two scraper arms of a scraper tool for scraping the pet waste into the bag, so as to avoid a hand of a user to have contact with the pet waste.

Description of Related Arts

Raising a pet such as a dog and a cat gives people much fun, but a question nagged a pet owner is how to pick up the pet waste, for it is disgusting for the pet owner to pick up the poop of the pet when walking the pet. Currently, the pet owner may carry a bag dispenser with him or her, when the pet poops waste on the ground or grass, the pet owner uses a waste bag from the bag dispenser to collect the pet waste. More specifically, the pet owner has to use one hand to hold on the waste bag and then scrape the pet waste into the waste bag, so that inevitably, the hand of the pet owner has to touch the pet waste that makes the pet owner feel disgusting even his or her hand is at the outer side of the waste bag. In addition, the waste bag may get dirty when the pet waste is scraped into it through an opening thereof, that is to say, the pet waste may residue on an end wall around the opening, making the pet owner be easy to have contact with the residual pet waste when the pet owner is tying up the opening of the waste bag as well as during the pet owner is carrying the waste bag with the packaged pet waste to a disposing can.

A conventional solution to avoid the pet owner to directly use his or her hand to pick up the pet waste is to employ a picking tool including a holding handle and two picking arms. During scraping, the pet owner can hold on the handle with one hand to operate the picking arms to scrape the pet waste into the waste bag which is held by the other hand of the pet owner. However, the process for scraping the pet waste into the waste bag requires two hands of the pet owner to cooperate so that no hand can be spared for holding a leash. In addition, the picking arms will get dirty after picking up the pet waste, so that another bag is required for storing the dirty picking tool.

SUMMARY OF THE PRESENT INVENTION

The invention is advantageous in that it provides a pet waste collector bag which enables the pet owner to scrape the pet waste into a bag body of the pet waste collector bag without touching the pet waste by a hand of the pet owner.

Another advantage of the invention is to provide a pet waste collector bag, wherein a retaining structure is coupled to the bag body for positing two scraper arms so as to scraping the pet waste into the bag body, so as to avoid the hand of the pet owner to touch the pet waste.

Another advantage of the invention is to provide a pet waste collector bag, wherein the scraper arms will not have contact with the pet waste, so that the scraper tool can be kept clean for being taken away by the pet owner after the pet waste scraping process.

Another advantage of the invention is to provide a pet waste collector bag, wherein a top opening of the bag body is clean after the pet waste scraping process, so that the hand of the user will not have contact with the pet waste.

Another advantage of the invention is to provide a pet waste collector bag, wherein according to an embodiment, the bag body can be flipped inside out for defining an outer overlapping portion which is overlapped with a rest portion of the bag body, and the scraper arms of a scraper tool can be disposed between the outer overlapping portion and the rest portion for scraping the pet waste, so that only an opening end of the rest portion will have contact with the pet waste, and an end wall around an opening of the bag body will not get dirty after the outer overlapping portion is flipped back.

Another advantage of the invention is to provide a pet waste collector bag, wherein according to an embodiment, the pet owner can insert the two scraper arms into two independent pockets or an integral pocket attached to the bag body for scraping the pet waste.

Another advantage of the invention is to provide a pet waste collector bag, wherein according to an embodiment, the pet owner can direct the two scraper arms to penetrate through one or more retaining strips attached to the bag body for scraping the pet waste.

Another advantage of the invention is to provide a pet waste collector bag, wherein according to an embodiment, the pet owner can insert each of the two scraper arms through an inserting hole formed between a retaining layer and the bag body to position each corresponding scraper arm for scraping the pet waste, and the inner layer attached to or integrally extended from the bag body can serve as an additional bag for storing the pet waste while the bag body can serve as an outer protective bag.

Another advantage of the invention is to provide a pet waste collector bag, wherein according to an embodiment, the pet owner can insert each of the two scraper arms into a position between the bag body and an extending retaining layer extended from the bag body to position each corresponding scraper arm for scraping the pet waste.

Another advantage of the invention is to provide a pet waste collector bag, wherein according to an embodiment, the pet owner can insert each of the two scraper arms into a position between the bag body and a folding retaining layer integrally folded from the bag body to position each corresponding scraper arm for scraping the pet waste.

Another advantage of the invention is to provide a pet waste collector bag, wherein according to an embodiment, the pet owner can insert each of the two scraper arms into a retaining groove or retaining hole of the bag body for scraping the pet waste, and after the pet waste is packaged in the bag body, an outer bag connected to the bag body can be flipped to cover and store the bag body therewithin, and the outer bag can also serves as an outer protective bag.

Another advantage of the invention is to provide a pet waste collector bag, wherein the bag body can be a container having a containing cavity, or a sheet which can be used to wrap the pet waste.

Another advantage of the invention is to provide a pet waste collector bag, wherein no special structure is required for the scraper tool, so that the scraper tool is easy to obtain.

Another advantage of the invention is to provide a pet waste collector bag, wherein the pet owner can use one hand to carry out the pet waste scraping process, so that the other hand of the user can be spared for holding a leash of the pet.

Another advantage of the invention is to provide a pet waste collector bag, wherein both the pet waste collector bag and the scraper tool are easy for carrying so as to facilitate the usage of the pet owner.

Another advantage of the invention is to provide a pet waste collector bag, wherein no complicated structure is required for the pet waste collector bag, so that it is easy and convenient for manufacturing.

Additional advantages and features of the invention will become apparent from the description which follows, and may be realized by means of the instrumentalities and combinations particularly pointing out in the appended claims.

According to the present invention, the foregoing and other objects and advantages are attained by a pet waste collector bag for coupling with two scraper arms for picking up the pet waste, wherein the pet waste collector bag comprises a bag body to and a retaining arrangement coupled to the bag body for retaining the two scraper arms so as to scrape the pet waste into the bag body in such a manner that there is no need for the scraper arms to touch the pet waste and the hands of the pet owner will not have contact with the pet waste during the pet waste picking operation.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIGS. 10A, 10B, 10C, 10D, 10E, 10F and 10G illustrate a method for picking up and collecting the pet waste by the pet waste collector bag according to the above second preferred embodiment of the present invention.

FIG. 13A is a perspective view of a pet waste collector bag according to another alternative mode of the above second preferred embodiment of the present invention.

FIG. 13B is a sectional view along line C-C of FIG. 13A.

FIG. 14 is a sectional view of the pet waste collector bag according to the another alternative mode of the above second preferred embodiment of the present invention, illustrating the bag body reversibly flipped inside out from an opening to form the waste collecting cavity FIGS. 15A, 15B, 15C, 15D, 15E, 15F and 15G illustrate a method for picking up and collecting the pet waste by the pet waste collector bag according to the another alternative mode of the above second preferred embodiment of the present invention.

FIG. 16A is a perspective view of a pet waste collector bag according to a third preferred embodiment of the present invention.

FIG. 16B is a sectional view along line D-D of FIG. 16A.

FIG. 17 is a sectional view of the pet waste collector bag according to the above third preferred embodiment of the present invention, illustrating the bag body reversibly flipped inside out from an opening to form the waste collecting cavity

FIGS. 22A, 22B, 22C, 22D, 22E, 22F and 22G illustrate a method for picking up and collecting the pet waste by the pet waste collector bag according to the above fourth preferred embodiment of the present invention.

FIGS. 25A, 25B, 25C, 25D, and 25E illustrate a method for picking up and collecting the pet waste by the pet waste collector bag according to the above fifth preferred embodiment of the present invention.

FIG. 26 is a perspective view of a pet waste collector bag according to a sixth preferred embodiment of the present invention.

FIGS. 27A, 27B, and 27C illustrate a method for picking up and collecting the pet waste by the pet waste collector bag according to the above sixth preferred embodiment of the present invention.

FIG. 28 is a perspective view of a pet waste collector bag according to an alternative mode of the above sixth preferred embodiment of the present invention.

FIGS. 29A, 29B, and 29C illustrate a method for picking up and collecting the pet waste by the pet waste collector bag according to the alternative mode of the above sixth preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIG. 1A to FIG. 3F of the drawings, a pet waste collector arrangement comprising a pet waste collector bag 10 and a scraper tool 20 according to a first preferred embodiment of the present invention is illustrated. The pet waste collector bag 10 is used for storing the pet waste. The scraper tool 20, which comprises two elongated scraper arms 21, is arranged for scraping the pet waste into the pet waste collector bag 10.

Figure 1A:
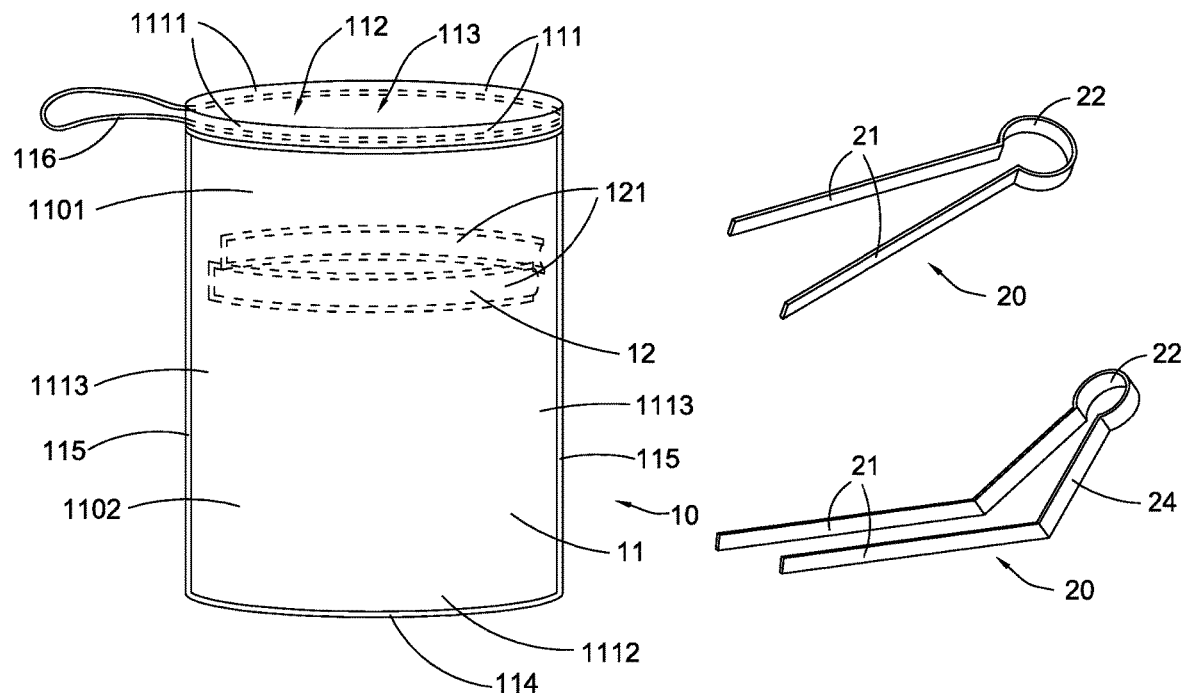
FIG. 1A and FIG. 1B are perspectives view of a pet waste collector bag and a scraper tool according to a first preferred embodiment of the present invention.

As shown in FIG. 1A of the drawings, the pet waste collector bag 10 comprises a bag body 11 which comprises two body layers 111 having a top opening 112 and defining a waste storing cavity 113 communicated to the top opening 112 for storing the pet waste, and a retaining arrangement 12 for positioning the two scraper arms 21 so as to scrape the pet waste into the waste storing cavity 113 of the bag body 11. Preferably, pet waste collector bag 10 is made of biodegradable plastic that can be decomposed.

More specifically, the bag body 11 comprises the two body layers 111 which are overlappedly with each other to form the waste storing cavity 113 between the two body layers 111. The body layers 111 can be formed by two individual sheets affixed with each other edge-to-edge, or can be formed by one single sheet overlappedly folded in half. For example, in this embodiment, each of the body layers 111 has a rectangular shape, wherein top edges 1111 of the two body layers 111 are remained unsealed to form the top opening 112 of the bag body 11, bottom edges 1112 of the body layers 111 are sealed by a bottom sealing seam 114, side edges 1113 at two sides of the body layers 111 are respectively sealed by two side sealing seams 115. Each of the bottom sealing seam 114 and the side sealing seams 115 can be a heat sealing seam or can be embodied as an adhesive bonding seam. It is appreciated that the bag body 11 can be configured to have different sizes and different shapes as long as the bag body 11 is large enough to collect the pet waste.

Figure 1B:
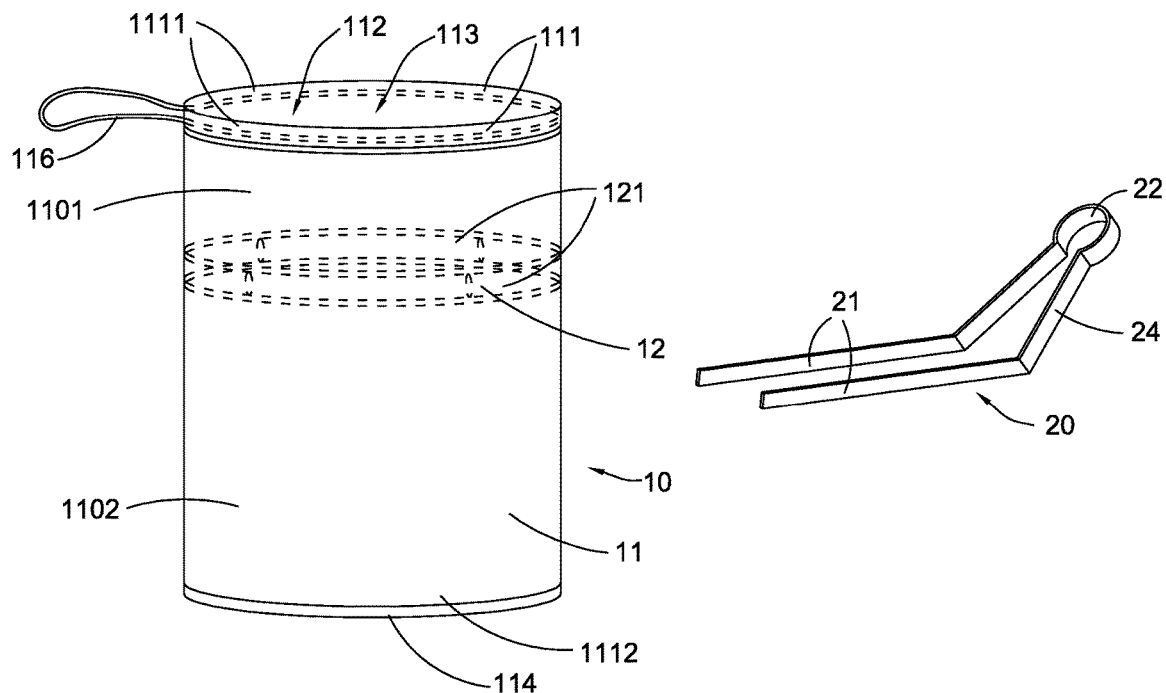

Referring to FIG. 1B of the drawings, the bag body 11 comprises the two body layers 111 which are overlappedly with each other to form the waste storing cavity 113 between the two body layers 111. The bag body 11 can be formed by an integral cylindrical bag which is sealed by the bottom sealing seam 114 at a bottom edge 11112 while the top edge 1111 is unsealed to form the top opening 112. In other words, the two body layers 111 of this embodiment are integrally formed as a single integral sheet, and a circular bottom edge 1112 of the single sheet is sealed by a bottom sealing seam 114. Accordingly, a single integral sheet which has a cylindrical shape is sealed at one end thereof for preparing the bag body 11 of this preferred embodiment of the present invention.

In this preferred embodiment, as is shown in FIG. 1A, the retaining arrangement 12 comprises two pockets 121 attached to the two body layers 111 at an inner side thereof adapted for positioning the two scraper arms 21 of the scraper tool 20. More specifically, a retaining groove 1211 having an inserting hole 1212 is defined between each of the two pockets 121 and the corresponding body layer 111, so that each of the two scraper arms 21 of the scraper tool 20 can be inserted into the retaining groove 1211 through the inserting hole 1212 and retained between the pocket 121 and the corresponding body layer 111, and then the two scraper arms 21 of the scraper tool 20 can be operated for scraping the pet waste into the waste storing cavity 113 of the bag body 11.

Figure 2:
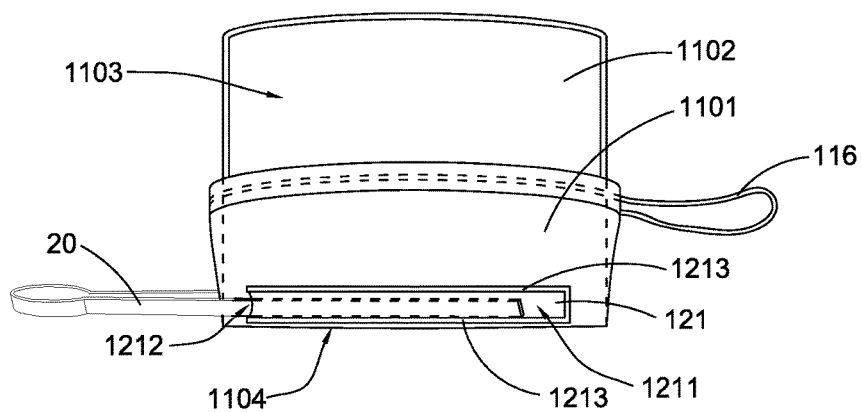
FIG. 2 is a sectional view of the pet waste collector bag according to the above first preferred embodiment of the present invention, illustrating the bag body reversibly flipped inside out from an opening to form a waste collecting cavity.

Accordingly, as is shown in FIG. 1A and FIG. 2 of the drawings, each of the two pockets 121 of the retaining arrangement 12 is sealed to the corresponding body layer 111 by two connecting seams 1213 each can be embodied as a heat sealing seam or an adhesive bonding seam, at least one end of each of the two pockets 121 is not sealed so as to form the inserting hole 1212. Referring to FIGS. 1A and 1B, according to this preferred embodiment, two ends of each of the two pockets 121 are not sealed for forming two inserting holes 1212, so that the pet owner is convenient for operating on the scraper tool 20 to insert the two scraper arms 21 at either side of each of the two pockets 121.

Referring to FIG. 1A to FIG. 2 of the drawings, each of the two pockets 121 of the retaining arrangement 12 is arranged at a middle position of the bag body 11. In other words, each of the two pockets 121 is distanced apart from each of the top edges 1111 of the two body layers 111 and the bottom edges 1112 of the two body layers 111. Accordingly, the two pockets 121 of the retaining arrangement 12 divide the bag body 11 into a first bag portion 1101 which is extended between the top edges 1111 of the two body layers 111 and the two pockets 121, and a second bag portion 1102 which is extended between the bottom edges 1112 of the two body layers 111 and the two pockets 121.

The bag body 11 can be flipped inside out by folding the first bag portion 1101 towards the second bag portion 1102 to expose the two pockets 121, so that the first bag portion 1101 is able to form an outer overlapping portion which is overlapped at a rest portion of the bag body 11 which is the second bag portion 1102, as shown in FIG. 2 of the drawings. Then, the two scraper arms 21 can be respectively inserted into the two retaining grooves 1211 for scraping the pet waste into the bag body 11. More specifically, when the first bag portion 1101 is flipped to be overlapped with the second bag portion 1102, the second bag portion 1102 actually forms a waste collecting cavity 1103 with a collecting opening 1104, so that the pet waste can be scraped into the waste collecting cavity 1103 through the collecting opening 1104 under the operation of the two scraper arms 21 of the scraper tool 20. In other words, the waste collecting cavity 1103 is formed at a portion of the waste storing cavity 113 of the bag body 11 for functioning as a tempera cavity for storing the pet waste, and after the first bag portion 1101 is flipped back, the bag body 11 with the first bag portion 1101 and the second bag portion 1102 form the waste storing cavity 113 again.

In particular, the waste collecting cavity 1103 is formed at the bottom portion of the waste storing cavity 113. Preferably, a volume of the waste collecting cavity 1103 is at least half of the waste storing cavity 113. According to an example, the two pockets 121 are affixed to the one-third of the bag body 11 from the top opening 112 thereof, the volume of the waste collecting cavity 1103 is about two-third of the waste storing cavity 113.

As is shown in FIGS. 1A to 2, the bag body 11 further comprises a drawstring 116 extended around the top opening 112 for tie-closing the waste storing cavity 113 after the pet waste is collected therein. In other words, the drawstring 116 is provided at an upper portion of the first bag portion 1101 of the bag body 11, so that when the pet waste is scraped into the waste collecting cavity 1103 of the second bag portion 1102, the first bag portion 1101 which is overlapped on the second bag portion 1102 can be flipped back and the drawstring 116 can be operated for closing the top opening 112.

The method of manufacturing the pet waste collector bag 10 may comprise a step of forming the bag body 11 and a step of forming the retaining arrangement 12 on the bag body 11. As an example, the method may comprise the steps of preparing two body layers 111 which are respectively attached with the two pockets 121 by two connecting seams 1213, overlapping the two body layers 111 in such a manner that the pockets 121 are hidden between the two body layers 111, connecting the two body layers 111 by the side sealing seams 115 and the bottom sealing seam 114, and arranging the drawstring 116 around the top opening 112 defined by the two body layers 111 at a top side thereof.

As an alternative mode, the two pockets 121 may also be attached to an outer side of the bag body 11. The first bag portion 1101 may have two holes that can be aligned with the corresponding inserting hole 1212 of each of the two pockets 121 when the first bag portion 1101 is flipped to be overlapped with the second bag portion 1102, so that the scraper arms 21 can be penetrated through the holes of first bag portion 1101 and then are respectively inserted into the two pockets 121 through the correspond inserting hole 1212 for picking up the pet waste.

The scraper arms 21 retained in the retaining groove 1211 can be moved toward each other to enclose the collecting opening 1104 within the second bag portion 1102 of the bag body 11. When moving the scraper arms 21 toward each other, i.e. the scraper arms 21 are moved alongside with each other, the scraper arms 21 are also arranged for scraping the waste within the waste collecting cavity 1103, as is shown in FIGS. 3B and 3C. In other words, when the bag body 11 of the present invention is reversibly flipped inside out from the top opening 112 to expose the two pockets 121, the scraper arms 21 can be respectively inserted into the two pockets 121 so as to be extended along the collecting opening 1104 of the waste collecting cavity 1103. Therefore, when the scraper arms 21 are moved toward each other to enclose the waste collecting cavity 1103, the pet waste is easy to be scraped and scooped into the waste collecting cavity 1103.

In addition, referring to FIGS. 1A and 2 of the drawings, the scraping tool comprises a spring-loaded pivot joint 22 and the two scraper arms 21 which are respectively extended from the spring-loaded pivot joint 22, so that the two scraper arms 21 are pivotally coupled with each other end-to-end via the spring-loaded pivot joint 22 to form the scraper tool 20 with a V-shaped configuration. In other words, each of the scraper arms 21 has a pivot end, and the pivot ends of the scraper arms 21 are pivotally coupled by the spring-loaded pivot joint 22. Therefore, when scraping the pet waste, a portion of each of the scraper arms 21 is inserted into the retaining groove 1211 while the pet owner can hold on a rest portion of each of the scraper arms 21 and applies a compression force thereto, the scraper arms 21 are driven to move toward each other for picking up the pet waste into the waste collecting cavity 1103. Once the compression force is released, the spring-loaded pivot joint 22 will push the scraper arms 21 pivotally moved away from each other.

It is thus can be seen that the pet owner can use one hand to pick up the pet waste during the pet waste scraping process by using the pet waste collector bag 10 and the scraper tool 20 of this preferred embodiment of the present invention. More specifically, when the two scraper arms 21 are respectively inserted into the retaining grooves 1211 to retain a portion of each of the two scraper arms 21 in the corresponding retaining groove 1211, the pet owner can hold on the rest portion of each of the two scraper arms 21 by different fingers of one hand of the pet owner, and then compress the two scraper arms 21 for scraping the pet waste into the waste collecting cavity 1103, while the other hand of the pet owner can still hold on the leash of the pet. Since the pet owner only needs to hold on the scraper arms 21 of the scraper tool 20 for carrying out the waste scraping process, the hands of the pet owner will not touch the pet waste so that the pet owner will not feel disgusting during the waste picking process.

Furthermore, when picking up the pet waste, only an upper edge of the second bag portion 1102 has a possibility to have contact with the pet waste and may get dirty, the top edges 1111 of the first bag portion 1101 are actually flipped to a position overlapping on the second bag portion 1102, so that the top edges 1111 of the first bag portion 1101 will not get dirty by the pet waste during the waste picking action. After the pet waste is scraped into the waste collecting cavity 1103, the first bag portion 1101 is flipped back, the top edges 1111 of the first bag portion 1101 which are also the top edges 1111 of the bag body 11 are kept clean so that the hands of the pet owner will not get dirty when the pet owner uses his or her hands to close the top opening 112 by pulling the drawstring 116.

Since the scraper arms 21 are inserted into the pockets 121 for scraping the pet waste, the scraper arms 21 will not directly have contact with the pet waste, so that the scraper arms 21 of the scraper tool 20 will also not be dirty, and thus the scraper tool 20 can be kept clean and carried along with him or her by the pet owner after the waste collecting operation.

It is worth mentioning that the introduction of the retaining arrangement 12 of the present invention further facilitates the waste collecting process in that the pet owner may not need to bring the scraper tool 20 with him or her when walking the pet. In other words, the pet owner may only need to carry a plurality of the pet waste collector bag 10s 10, and it is easy to find two rods to function as the scraper tool 20 for picking up the pet waste. Particularly, the pet owner can look for two rods on the road and insert the two rods into the two pockets 121 for scraping the paste waste.

Figure 3A:
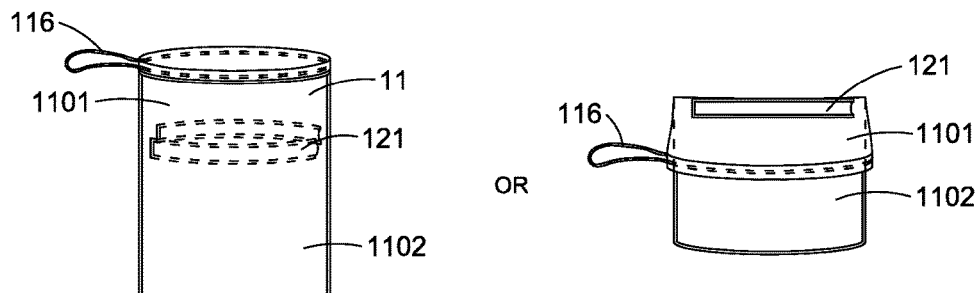
FIGS. 3A, 3B, 3C, 3D, 3E and 3F illustrate a method for picking up and collecting the pet waste by the pet waste collector bag according to the above first preferred embodiment of the present invention.
Figure 3B:
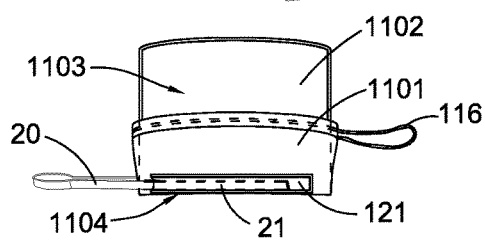
Figures 3C, 3D, 3E, 3F:
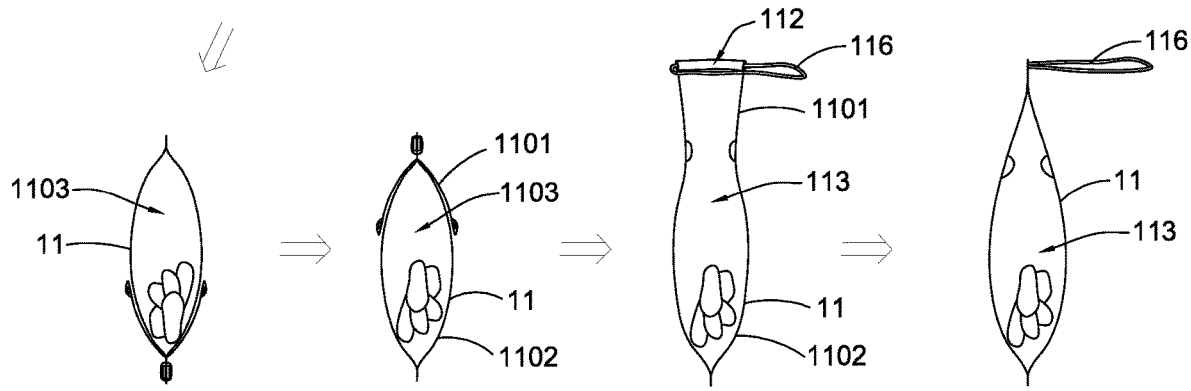

As is shown in FIGS. 3A to 3F, the operation for collecting pet waste is illustrated in detail. As shown in FIG. 3A, a product of the pet waste collector bag 10 can be in a unfolded state in which the first bag portion 1101 is unfolded with the second bag portion 1102, i.e. the first bag portion 1101 and the second bag portion 1102 are extended along a longitudinal direction so that the first bag portion 1101 is coplanar with the second bag portion 1102. Alternatively, the product of the pet waste collector bag 10 can be in a folded state in which the first bag portion 1101 is overlapped with the second bag portion 1102 to expose the waste collecting cavity 1103 of the bag portion and the pockets 121 attached to the first bag portion 1101, so that no additional flipping operation for flipping the first bag portion 1101 to the folded state is required when cleaning up the pet waste from the ground or grass.

Referring to FIG. 3B and FIG. 3C of the drawings, the bag body 11 is placed upside-down, the waste collecting cavity 1103 with the collecting opening 1104 is exposed when the bag body 11 is flipped. Thus, the scraper arms 21 can be inserted into the pockets 121 for scraping the pet waste into the waste collecting cavity 1103 by moving the scraper arms 21 toward each other. As shown in FIG. 3D, the bag body 11 is flipped to its upright state and the pet waste is dropped to a bottom of the bag body 11. Referring to FIGS. 3E and 3F of the drawings, the scraper arms 21 of the scraper tool 20 can be removed from the bag body 11, the first bag portion 1101 can be flipped back to not overlap with the second bag portion 1102 and define the top opening 112 which is facing upward, and then the drawstring 116 can be operated to close the top opening 112 of the bag body 11. Alternatively, the pet owner may hold on the scraper arms 21 to carry the bag body 11 and to pull the drawstring 116 for closing the top opening 112 at the same time. Therefore, the hands of the user will not touch any portion of the bag body 11 except the drawstring 116.

Accordingly, the present invention further provides a method for collecting the pet waste by the pet waste collector bag 10, wherein the method comprises the following steps.

(a) Configure the waste collecting cavity 1103 of the second bag portion 1102 by overlapping the first bag portion 1101 on the second bag portion 1102 of the bag body 11.

(b) Retain the scraper arms 21 of the scraper tool 20 by the retaining arrangement 12 for scraping the pet waste into the waste collecting cavity 1103.

(c) Define the top opening 112 of the bag body when the first bag portion 1101 is flipped to a position unfolded with the second bag portion 1102 and close the top opening 112 for storing the pet waste in the waste storing cavity 113 of the bag body 11.

According to this preferred embodiment of the present invention, the bag body 11 may be flipped inside out from the top opening 112 to fold the first bag portion 1101 with the second bag portion 1102, and the pockets 121 in the waste storing cavity 113 can be exposed. Retaining the scraper arms 21 of the scraper tool 20 can be embodied as receiving each of the scraper arms 21 of the scraper tool 20 in the corresponding retaining groove 1211 of each of the two pockets 121.

In addition, the scraper tool 20 may further comprise two actuator arms 24 integrally extended from the spring-loaded pivot joint 22 for the pet owner to hold thereon. The two scraper arms 21 are integrally and inclinedly extended from the two actuator arms 24 respectively for scraping the pet waste into the bag body 11 of the pet waste collector bag 10. It is worth mentioning that when the pockets 121 are attached to the inner side of the bag body 11, the scraper tool 20 without the inclinedly extended actuator arms 24 can be operated to insert the two scraper arms 21 into the two pockets 121 after the bag body 11 is flipped inside out to expose the pockets 121. When the pockets 121 are attached to the outer side of the bag body 11, the scraper tool 20 with the inclinedly extended actuator arms 24 actually can allow the two scraper arms 21 to be inserted into the two pockets 121 before the bag body 11 is flipped inside out to expose the pockets 121, as will be discussed in detail in the following description.

Referring to FIGS. 4A to 4E of the drawings, alternative modes of the scraper tool 20 are illustrated. It is worth mentioning that the alternative modes are illustrated as examples, the person of ordinary skilled in the art should understand many kinds of scraper tool 20 can be employed for scraping the pet waste into the bag body 11 of the pet waste collector bag 10 as long as the scraper tool 20 can provide two scraper arms 21.

Figure 4A:
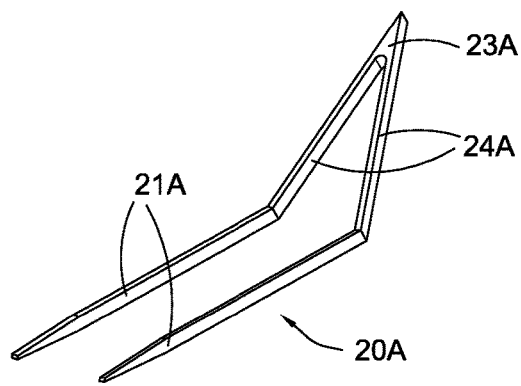
FIGS. 4A, 4B, 4C, 4D and 4E are perspective views of the scraper tool according to alternative modes of the above first preferred embodiment of the present invention.

Referring to FIG. 4A of the drawings, a scraper tool 20A according to a first alternative mode is illustrated. More specifically, the scraper tool 20A comprises two scraper arms 21A, a connector 23A, and two actuator arms 24A integrally extended from the connector for the pet owner to hold thereon. The two scraper arms 21A are integrally and inclinedly extended from the two actuator arms 24A respectively for scraping the pet waste into the bag body 11 of the pet waste collector bag 10.

Accordingly, the scraper tool 20A can be made of resilient material, and when the pet owner holds on the actuator arms 24A by a hand to insert the scraper arms 21A into the retaining arrangement 12 such as the two pockets 121 in the above first preferred embodiment, the two scraper arms 21A can be driven to move toward each other or away from each other by operation on the two actuator arms 24A. It is worth mentioning that since the pet owner can hold on the actuator arms 24A which are inclinedly extended from the two scraper arms 21A respectively, the pet owner will feel more convenient for carrying out the scraping action with the holding gesture on the two actuator arms 24A, and the hand of the pet owner does not need to touch the ground.

Figure 4B:
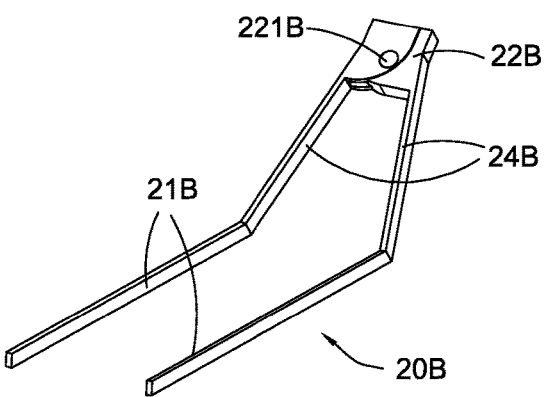

Referring to FIG. 4B of the drawings, a scraper tool 20B according to a second alternative mode is illustrated. More specifically, the scraper tool 20B comprises two scraper arms 21B, a spring-loaded pivot joint 22B, and two actuator arms 24B connected to the connector for the pet owner to hold thereon. The two scraper arms 21B are integrally and inclinedly extended from the two actuator arms 24B respectively for scraping the pet waste into the bag body 11 of the pet waste collector bag 10.

In this second alternative mode, the pivot joint 22B comprises a pivot axle 221B, and the two actuator arms 24B are pivotally connector to the pivot joint 22B in such a manner that the two actuator arms 24B are capable of pivotally moving with respect to the pivot axle 221B for facilitating the scraping operation.

Figure 4C:
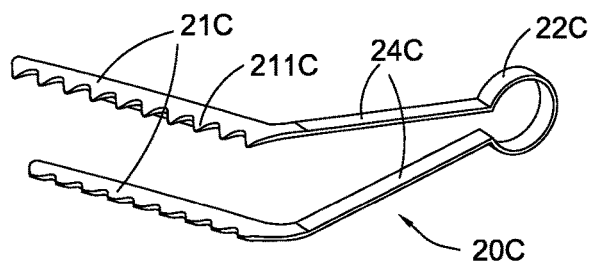

Referring to FIG. 4C of the drawings, a scraper tool 20C according to a third alternative mode is illustrated. More specifically, the scraper tool 20C comprises two scraper arms 21C, a spring-loaded pivot joint 22C, and two actuator arms 24C connected to the spring-loaded pivot joint 22C for the pet owner to hold thereon. The two scraper arms 21C are integrally and inclinedly extended from the two actuator arms 24C respectively for scraping the pet waste into the bag body 11 of the pet waste collector bag 10.

Each of the scraper arms 21C has a serrated shape, wherein each of the scraper arms 21C has a plurality of scraping teeth 211C formed along a longitudinal edge thereof for further enhancing the scraping operation when the scraper arms 21C are moved toward each other. Accordingly, the scraping teeth 211C of each of the scraper arms 21C are pointing toward a bottom when in operation. Preferably, each of the scraping teeth 211C has a curved shape, to serve as a clawing tooth to scrape the pet waste when the scraper arms 21C are moved toward each other. In particular, the scraping teeth 211C at one scraper arm 21C are misaligned with the scraping teeth 211C at another scraper arm 21C, such that when the scraper arms 21C are moved toward each other, the scraping teeth 211C at one scraper arm 21C are alternating with the scraping teeth 211C at another scraper arm 21C. In other words, the scraping teeth 211C at one scraper arm 21 are engaged with the gaps between the scraping teeth 211C at another scraper arm 21C for closing the collecting opening 1104 of the second bag portion 1102 of the bag body for facilitating the scraping operation.

Figure 4D:
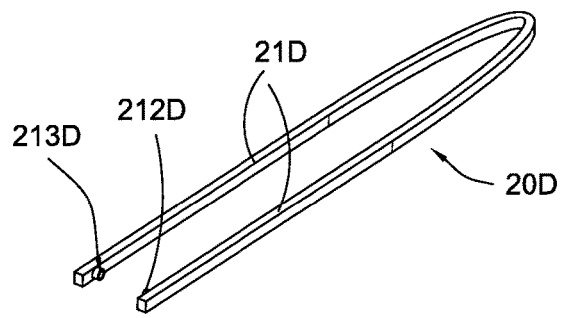

Referring to FIG. 4D of the drawings, a scraper tool 20D according to a fourth alternative mode is illustrated. More specifically, the scraper tool 20D comprises two scraper arms 21D for scraping the pet waste into the bag body 11 of the pet waste collector bag 10.

One of the scraper arms 21D comprises an engaging protrusion 212D transversely and inwardly extended from a body portion thereof, while the other scraper arm 21D has an engaging hole 213D for engaging with the engaging protrusion 212D. Accordingly, when the two scraper arms 21D are penetrate the retaining grooves 1211 of the retaining arrangement 12 of the above first preferred embodiment, the engaging protrusion 212D can be engaged with the engaging hole 213D for closing the collecting opening 1104 of the second bag portion for scraping the pet waste into the waste collecting cavity 1103. After the scraping operation, the engaging protrusion 212D also may be retained at the engaging hole 213D for form a compact structure of the scraping tool 20D for facilitating the storing and carrying of the scraping tool 20D.

Figure 4E:
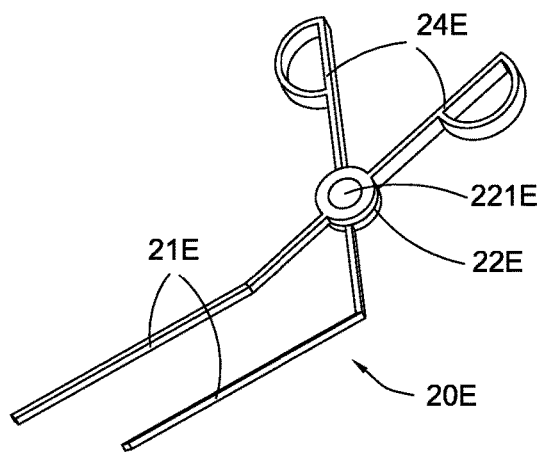

Referring to FIG. 4E of the drawings, a scraper tool 20E according to a fifth alternative mode is illustrated. More specifically, the scraper tool 20E comprises two scraper arms 21E, a pivot joint 22E, and two actuator arms 24E connected to the pivot joint 22E for the pet owner to hold thereon. The two scraper arms 21E are integrally and inclinedly extended from the two actuator arms 24E respectively for scraping the pet waste into the bag body 11 of the pet waste collector bag 10.

According to this preferred embodiment, the two actuator arms 24E are pivotally coupled with each other via a pivot axle 221E at a middle portion thereof to form the actuator arms 24E with a scissor-like configuration, such that the user is able to operate the actuator arms 24E to move the scraper arms 21E toward each other and away from each other.

Figure 5A:
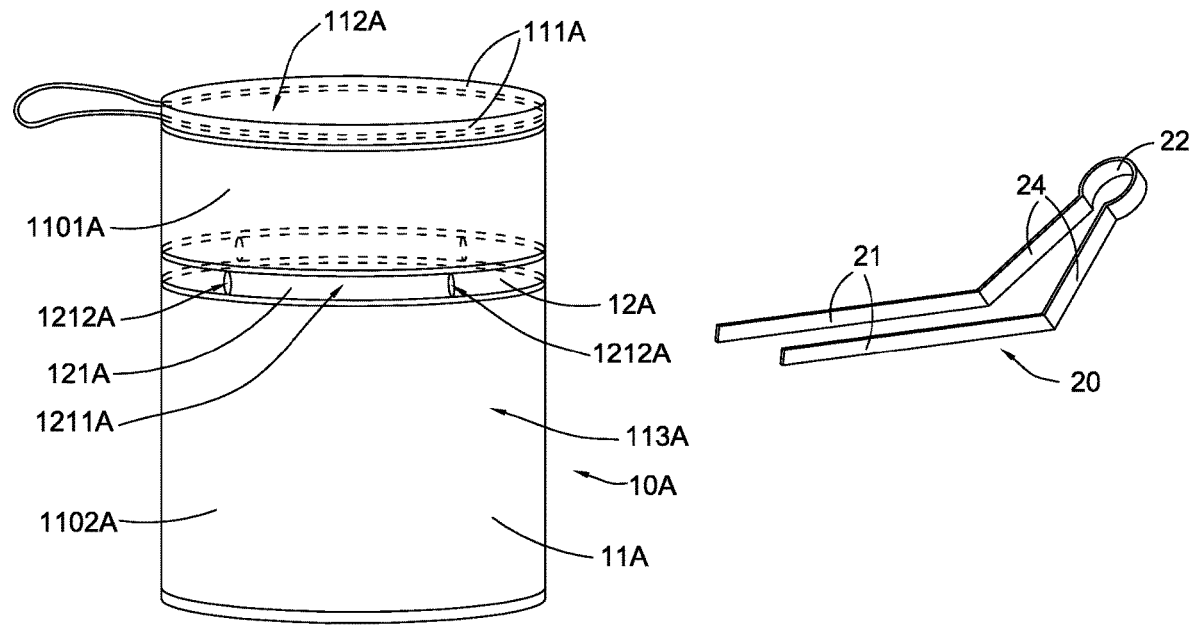
FIG. 5A is a perspective view of a pet waste collector bag according to a first alternative mode of the above first preferred embodiment of the present invention.
Figure 5B:
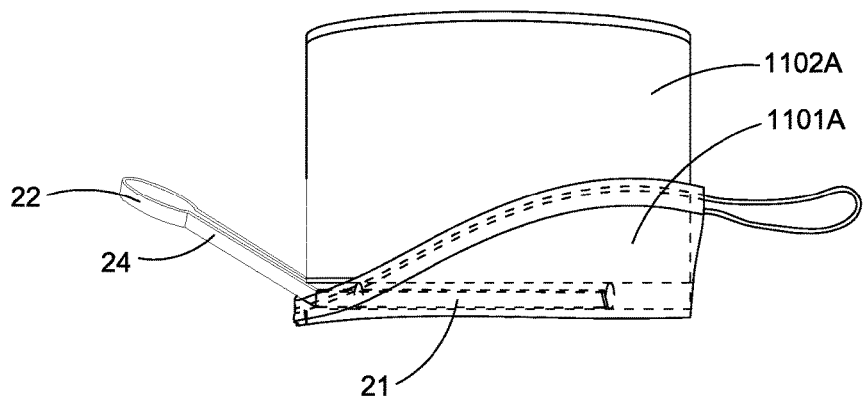
FIG. 5B is a sectional view of the pet waste collector bag according to the first alternative mode of the above first preferred embodiment of the present invention, illustrating the bag body reversibly flipped inside out from an opening to form a waste collecting cavity.

Referring to FIG. 5A and FIG. 5B of the drawings, a pet waste collector bag 10A according to a first alternative mode of the above first preferred embodiment of the present invention is illustrated. Similarly, the pet waste collector bag 10A comprises a bag body 11A which comprises two body layers 111A having a top opening 112A and defining a waste storing cavity 113A communicated to the top opening 112A for storing the pet waste, and a retaining arrangement 12A for positioning the two scraper arms 21 so as to scrape the pet waste into the waste storing cavity 113A of the bag body 11A.

In addition, in this preferred embodiment, the retaining arrangement 12A comprises a single pocket 121A attached to the two body layers 111A at an outer side thereof adapted for positioning the two scraper arms 21 of the scraper tool 20. More specifically, a retaining groove 1211A having two inserting hole 1212A at two opposite ends thereof is defined between the pocket 121A and the corresponding body layer 111A, so that each of the two scraper arms 21 of the scraper tool 20 can be inserted into the retaining groove 1211A through the inserting hole 1212A and retained between the pocket 121A and the corresponding body layer 111A, and then the two scraper arms 21 of the scraper tool 20 can be operated for scraping the pet waste into the waste storing cavity 113A of the bag body 11A.

Accordingly, similarly, the pocket 121A of the retaining arrangement 12A is arranged at a middle position of the bag body 11A dividing the bag body 11A into a first bag portion 1101A and a second bag portion 1102A. The bag body 11A can be flipped inside out by folding the first bag portion 1101A towards the second bag portion 1102A to expose the pocket 121A. Then, the two scraper arms 21 can be respectively inserted into the retaining groove 1211A through the two inserting holes 1212A for scraping the pet waste into the bag body 11A. After the first bag portion 1101A is flipped back, the bag body 11A with the first bag portion 1101A and the second bag portion 1102A form the waste storing cavity 113A again and the top opening 112A can be closed so that the pet waste is sealedly stored in the waste storing cavity 113A.

Since the single pocket 121A is attached to the outer side of the bag body 11A, the scraper arms 21 inclinedly extended from the two actuator arms 24 can be inserted into the single pocket 121A before the first bag portion 1101A is flipped to be overlap with the second bag portion 1102A, because the influence to the upward flipping movement of the first bag portion 1101A can be reduced by the introduction of the inclinedly extended two actuator arms 24.

Figure 6A:
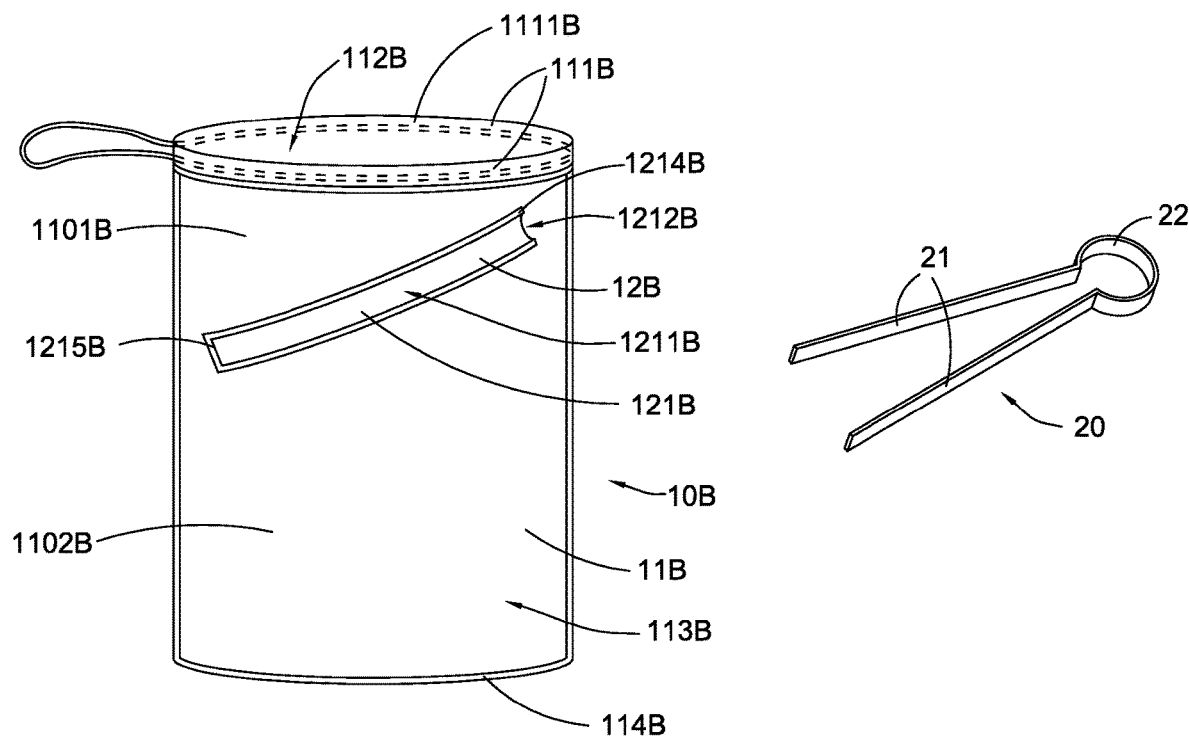
FIG. 6A is a perspective view of a pet waste collector bag according to a second alternative mode of the above first preferred embodiment of the present invention.
Figure 6B:
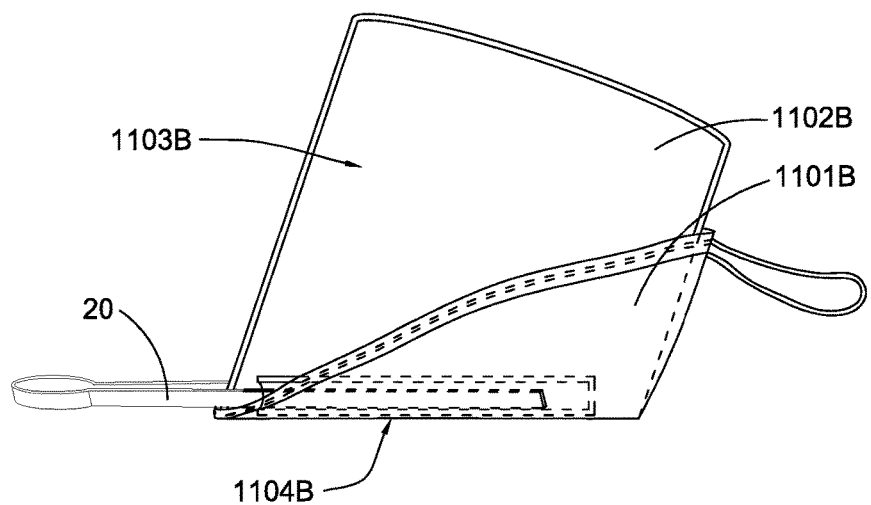
FIG. 6B is a sectional view of the pet waste collector bag according to the second alternative mode of the above first preferred embodiment of the present invention, illustrating the bag body reversibly flipped inside out from an opening to form the waste collecting cavity.

Referring to FIG. 6A and FIG. 6B of the drawings, a pet waste collector bag 10B according to a second alternative mode of the above first preferred embodiment of the present invention is illustrated. Similarly, the pet waste collector bag 10B comprises a bag body 11B which comprises two body layers 111B having a top opening 112B and defining a waste storing cavity 113B communicated to the top opening 112B for storing the pet waste, and a retaining arrangement 12B for positioning the two scraper arms 21 so as to scrape the pet waste into the waste storing cavity 113A of the bag body 11A.

In addition, in this preferred embodiment, the retaining arrangement 12B comprises two pockets 121B attached to the two body layers 111B at an outer side thereof adapted for positioning the two scraper arms 21 of the scraper tool 20. More specifically, a retaining groove 1211B having an inserting hole 1212B is defined between the pocket 121B and the corresponding body layer 111B, so that each of the two scraper arms 21 of the scraper tool 20 can be inserted into the retaining groove 1211B through the inserting hole 1212B and retained between the pocket 121B and the corresponding body layer 111B, and then the two scraper arms 21 of the scraper tool 20 can be operated for scraping the pet waste into the waste storing cavity 113B of the bag body 11B.

Accordingly, similarly, each of the two pockets 121B of the retaining arrangement 12B of this embodiment is inclined extended at the outer side of the bag body 11B in such a manner that an end 1214B of each pocket 121B is at a position adjacent to a top edge 1111B of the bag body 11B while an opposite end 1215B of each pocket 121B is away from the top edge 111B, dividing the bag body 11B into a first bag portion 1101B and a second bag portion 1102B. The bag body 11B can be flipped inside out by folding the first bag portion 1101B towards the second bag portion 1102B. Then, the two scraper arms 21 can be respectively inserted into the retaining groove 1211B through the inserting hole 1212B for scraping the pet waste into the bag body 11B. More specifically, when the first bag portion 1101B is flipped along the inclinedly extending pockets 121B, so as to be overlapped with the second bag portion 1102B, as shown in FIG. 6B of the drawings, the second bag portion 1102B actually forms a waste collecting cavity 1103B with a collecting opening 1104B, so that the pet waste can be scraped into the waste collecting cavity 1103B through the collecting opening 1104B under the operation of the two scraper arms 21 of the scraper tool 20. After the first bag portion 1101B is flipped back, the bag body 11B with the first bag portion 1101B and the second bag portion 1102B form the waste storing cavity 113B again and the top opening 112B can be closed so that the pet waste is sealedly stored in the waste storing cavity 113B. It is worth mentioning that each of the pockets 121B may be embodied as a plurality of retaining strips, similar to the above preferred embodiment.

Since the two pockets 121B of the retaining arrangement 12B are arranged at the outer side of the bag body 11B, there is no need to flip the first bag portion 1101B for exposing the two pockets 121B, so that actually before the step of overlapping the first bag portion 1101B with the second bag portion 1102B, the two scraper arms 21 of the scraper tool 20 can be respectively inserted into the two pockets 121B. In addition, the scraper tool 20 may not be formed with inclinedly extended scraper arms 24 since the scraper tool 20 does not block the upward flipping movement of the first bag portion 1101B of the bag body 11B.

Figure 7A:
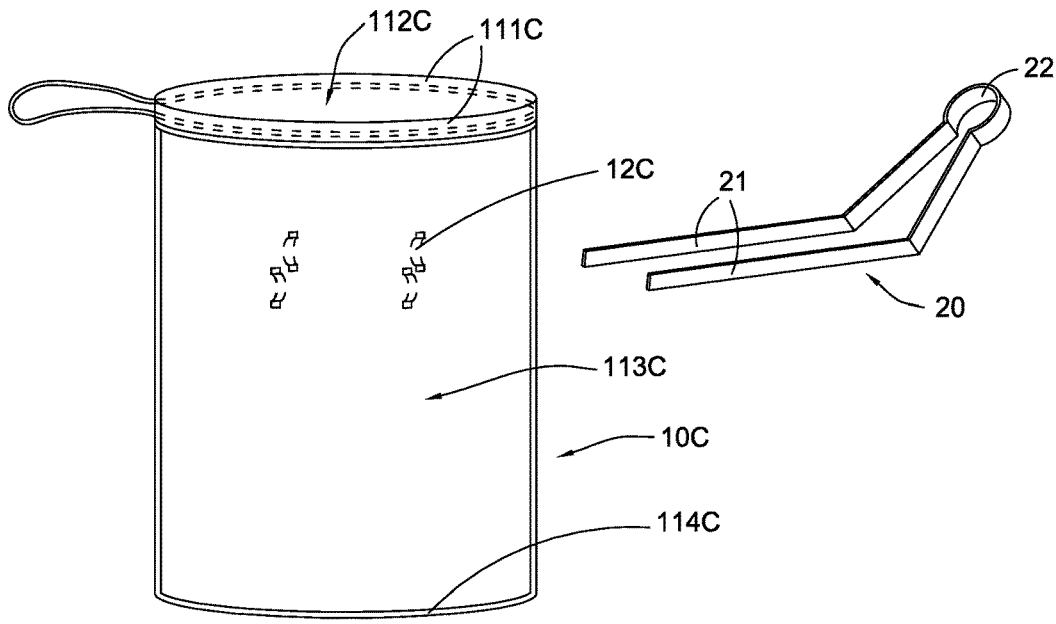
FIG. 7A is a perspective view of a pet waste collector bag according to a third alternative mode of the above first preferred embodiment of the present invention.
Figure 7B:
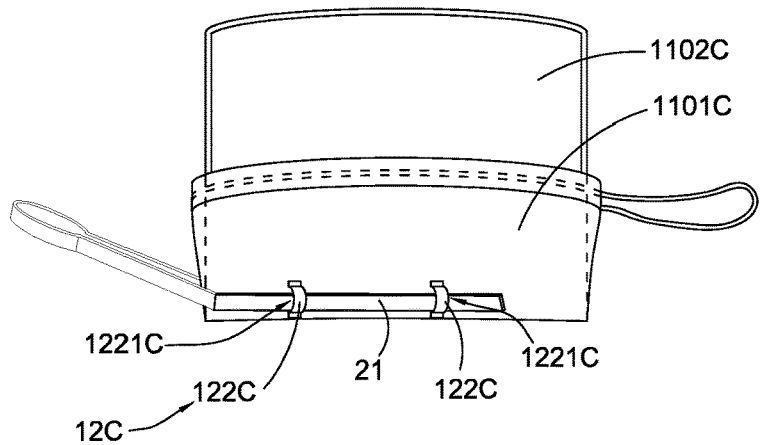
FIG. 7B is a sectional view of the pet waste collector bag according to the third alternative mode of the above first preferred embodiment of the present invention, illustrating the bag body reversibly flipped inside out from an opening to form the waste collecting cavity.

Referring to FIG. 7A and FIG. 7B of the drawings, a pet waste collector bag 10C according to a third alternative mode of the above first preferred embodiment of the present invention is illustrated. Similarly, the pet waste collector bag 10C comprises a bag body 11C which comprises two body layers 111C having a top opening 112C and defining a waste storing cavity 113C communicated to the top opening 112C for storing the pet waste, and a retaining arrangement 12C for positioning the two scraper arms 21 so as to scrape the pet waste into the waste storing cavity 113C of the bag body 11C.

In addition, in this preferred embodiment, the retaining arrangement 12C comprises a plurality of retaining strips 122C attached to the two body layers 111C at an inner side thereof adapted such as by heat sealing or adhering for positioning the two scraper arms 21 of the scraper tool 20. More specifically, a retaining hole 1221C is defined by each retaining strips 122C, so that each of the two scraper arms 21 of the scraper tool 20 can be inserted through the retaining hole 1221C for scraping the pet waste into the waste storing cavity 113C of the bag body 11C. As is shown in FIG. 7B of the drawings, two retaining strips 122C can be attached to each body layer 111C, so that each scraper arm 21 can penetrate the two retaining strips 122C for preparing each scrapper arm 21 in position for implementing the subsequent waste scraping operation. Alternatively, the plurality of retaining strips 122C also can be attached to the two body layers 111C at an outer side thereof.

Figure 7C:
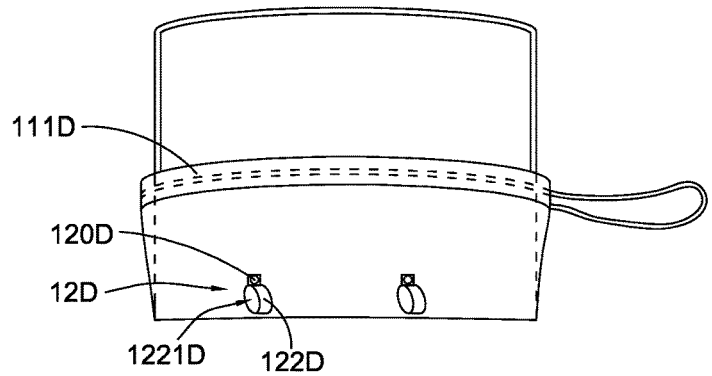
FIG. 7C is a perspective view of a pet waste collector bag according to a fourth alternative mode of the above first preferred embodiment of the present invention.
Figure 8A:
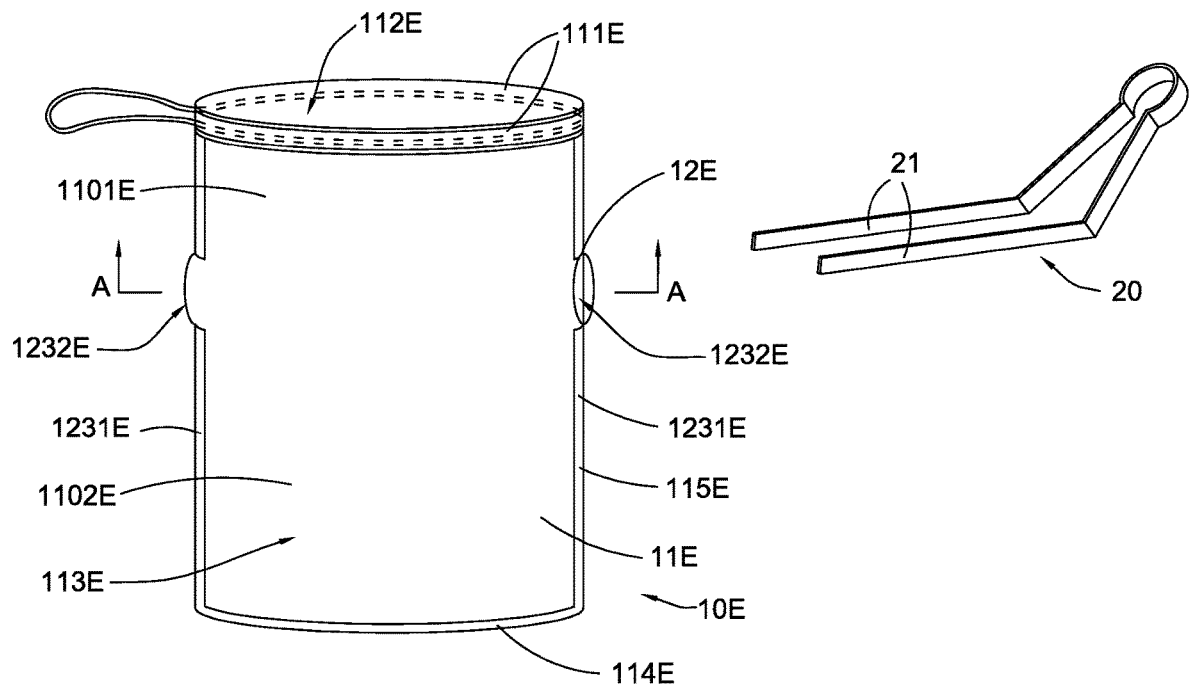
FIG. 8A is a perspective view of a pet waste collector bag according to a second preferred embodiment of the present invention.
Figure 8B:
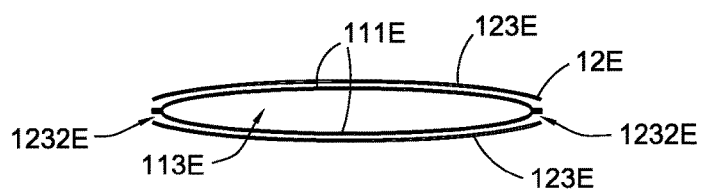
FIG. 8B is a sectional view along line B-B of FIG. 8A.
Figure 9:
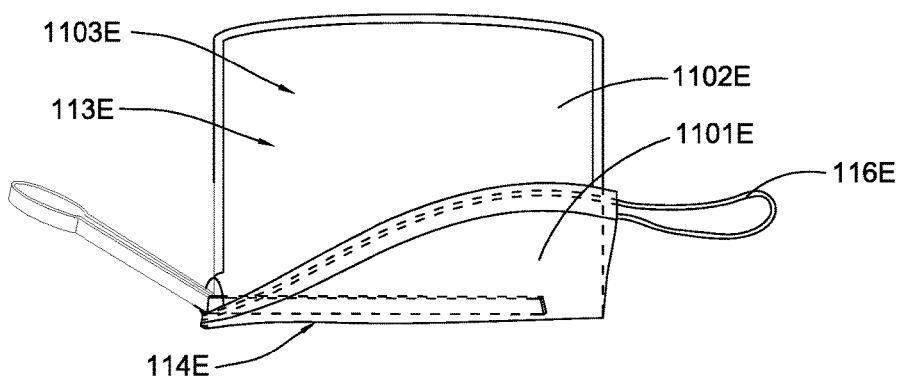
FIG. 9 is a sectional view of the pet waste collector bag according to the above second preferred embodiment of the present invention, illustrating the bag body reversibly flipped inside out from an opening to form the waste collecting cavity.

Referring to FIG. 7C of the drawings, according to a fourth alternative mode of the above first preferred embodiment of the present invention, a retaining arrangement 12D comprises a plurality of retaining strips 122D, each having a retaining hole 1221D, at an inner side of the body layers 111D adapted for positioning the two scraper arms 21 of the scraper tool 20. Each of the retaining strips 122D is further connected with a button member 120D which is mounted to the corresponding body layer 111D.

Referring to FIG. 8A to FIG. 10G of the drawings, a pet waste collector bag 10E according to a second preferred embodiment of the present invention is illustrated. More specifically, the pet waste collector bag 10E comprises a bag body 11E which comprises two body layers 111E defining a waste storing cavity 113E with a top opening 112E, and a retaining arrangement 12E for positioning the two scraper arms 21 for picking up the pet waste. Preferably, the bag body 11E and the retaining arrangement 12E are made of biodegradable plastic that can be decomposed.

More specifically, the bag body 11E comprises the two body layers 111E which are overlappedly with each other while the body layers 111E can be formed by two individual sheets affixed with each other edge-to-edge, or can be formed by one single sheet overlappedly folded in half. In this embodiment, each of the two body layers 111E can be integrally formed with the corresponding retaining layer 123E.

In this preferred embodiment, the retaining arrangement 12E comprises two retaining layers 123E attached to the two body layers 111E at an outer side thereof adapted for positioning the two scraper arms 21 of the scraper tool 20. More specifically, each retaining layer 123E is sealed to the corresponding body layer 111E at at least a lateral side thereof by a joint seam 1231E which is an intermittent seam that defines a retaining slot 1232E between the retaining layer 123E and the corresponding body layer 111E, so that each of the two scraper arms 21 of the scraper tool 20 can be inserted through the retaining slot 1232E to a position between the retaining layer 123E and the corresponding body layer 111E, and then the two scraper arms 21 of the scraper tool 20 can be operated for scraping the pet waste into the waste storing cavity 113E of the bag body 11E.

In this embodiment, a waste storing cavity 113E having a top opening 112E is formed by the two retaining layers 123E. Top edges of the two body layers 111E and top edges of the retaining layers 123E are remained unsealed to form the top opening 112E, bottom edges of the body layers 111E and bottom edges of the retaining layers 123E are sealed by a bottom sealing seam 114E, side edges at two sides of the body layers 111E are respectively sealed by two side sealing seams 115E. Each of the bottom sealing seam 114E and the side sealing seams 115E can be a heat sealing seam or can be embodied as an adhesive bonding seam. In addition, in an alternative mode, each side sealing seam 115E also may be embodied as the joint seam 1231E, so that side edges of the body layers 111E and side edges of the retaining layers 123E are sealed together.

The bag body 11E of this preferred embodiment is also divided into a first bag portion 1101E which is a portion above the retaining slot 1232E, and a second bag portion 1102E which is a rest portion under the retaining slot 1232E. The bag body 11E can be flipped inside out by folding the first bag portion 1101E towards the second bag portion 1102E to expose the two pockets 121E, so that the first bag portion 1101E is able to form an outer overlapping portion which is overlapped at a rest portion of the bag body 11E which is the second bag portion 1102E. Then, the two scraper arms 21 can be respectively inserted into the two retaining slots 1232E for picking up the pet waste. More specifically, when the first bag portion 1101E is flipped to be overlapped with the second bag portion 1102E, actually a portion of each retaining layer 123E is also flipped to be overlapped with the second bag portion 1102E, the rest portion of the bag body 11E actually forms a waste collecting cavity 1103E with a collecting opening 1104E, so that the pet waste can be scraped into the waste collecting cavity 1103E through the collecting opening 1104E under the operation of the two scraper arms 21 of the scraper tool 20. In other words, the waste collecting cavity 1103E is formed at a portion of the waste storing cavity 113E for functioning as a tempera cavity for storing the pet waste, and after the first bag portion 1101E is flipped back, the waste storing cavity 113E is formed again, and then a drawstring 116E can be operated to close the top open end of the pet waste collector bag 10E.

The method of manufacturing the pet waste collector bag 10E may comprise a step of forming the bag body 11E and a step of forming the retaining arrangement 12E on the bag body 11E. As an example, the method may comprise the steps of preparing two body layers 111E which are respectively attached with the two retaining layers 123E by two joint seams 1231E, placing the two body layers 111E in such a manner that the the two body layers 111E are hidden between the two retaining layers 123, connecting the two body layers 111E and the retaining layers 123E by the side sealing seams 115E and the bottom sealing seam 114E, and arranging the drawstring 116E at a top side thereof.

Referring to FIG. 10A to FIG. 10G of the drawing, this embodiment of the present invention further provides a method for collecting the pet waste by the pet waste collector bag 10E, and the method comprises the following steps.

(A) Form the waste collecting cavity 1103E by overlapping the first bag portion 1101E and an upper portion 1233E of the two retaining layers 123E on the second bag portion 1102E of the bag body 11E, wherein the waste collecting cavity is formed in the second bag portion 1102E of the bag body 11E.

(B) Position the scraper arms 21 of the scraper tool 20 by the retaining arrangement 12E for scraping the pet waste into the waste collecting cavity 1103E.

(C) Form the top opening 112E in the upper portion of the two retaining layers 123E when the first bag portion 1101E and the upper portion 1233E of the two retaining layers 123E are flipped to a position unfolded with the second bag portion 1102E and close the top opening 112E for storing the pet waste in the waste storing cavity 113E of the bag body 11E.

According to this preferred embodiment of the present invention, in the step (A), the bag body 11E and the retaining layers 123E may be flipped inside out from the top opening 112E to fold the first bag portion 1101E and the upper portion 1233E of the retaining layers 123E with the second bag portion 1102E. When the retaining laerys 123E is provided in the inner side of the bag body 11E, the retaining slots 1232E can be exposed in the step (A). In the step (B), retaining the scraper arms 21 of the scraper tool 20 can be embodied as a step of allowing each of the scraper arms 21 of the scraper tool 20 to penetrate through corresponding retaining slot 1232E.

Figure 11A:
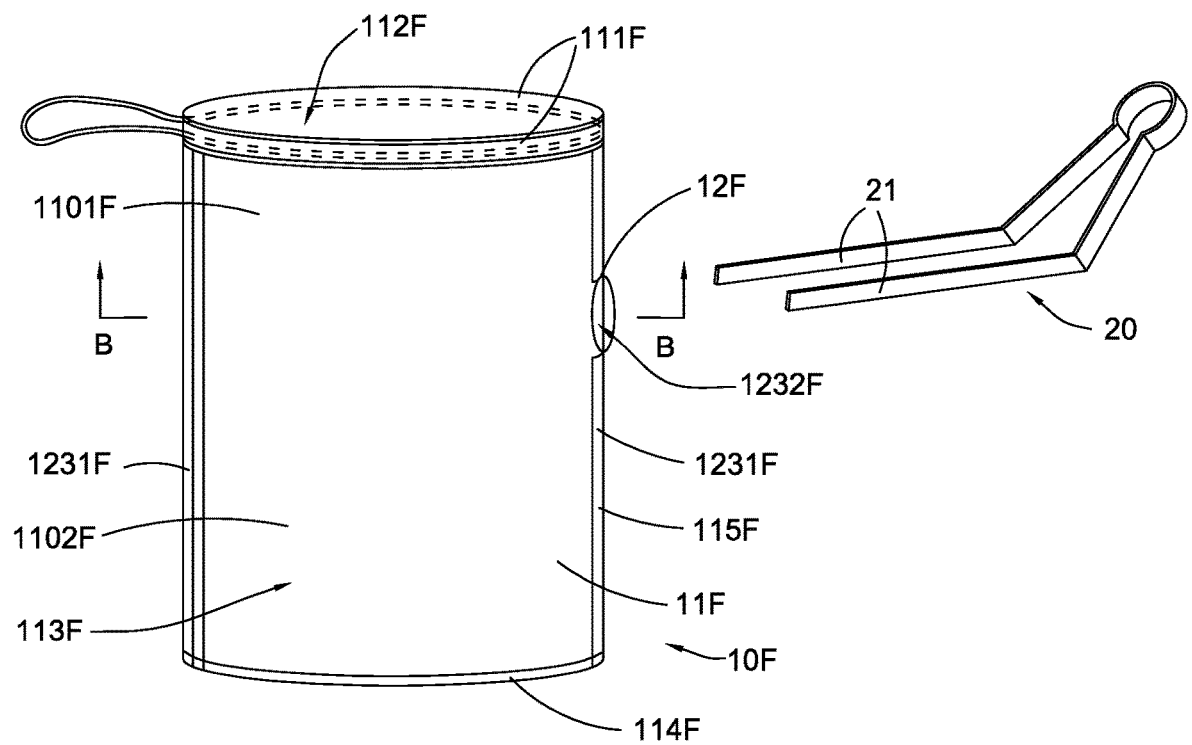
FIG. 11A is a perspective view of a pet waste collector bag according to the alternative mode of the above second preferred embodiment of the present invention.
Figure 11B:
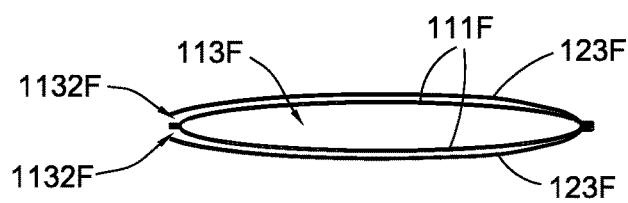
FIG. 11B is a sectional view along line A-A of FIG. 11A.

In this embodiment, the two retaining layers 123E actually form an outer bag at the outer side of the bag body 11E. It is worth mentioning that in an alternative mode, two independent retaining layers 123E may be attached to the body layers 111E for forming the retaining slots 1232E, and the retaining layers 123E may not form a bag like structure Referring to FIG. 11A to FIG. 12 of the drawings, a pet waste collector bag 10F according to an alternative mode of the above second preferred embodiment of the present invention is illustrated. Similarly, the pet waste collector bag 10F comprises a bag body 11F which comprises two body layers 111F, and a retaining arrangement 12F for positioning the two scraper arms 21 for picking up the pet waste.

More specifically, the bag body 11F comprises the two body layers 111F, the retaining arrangement 12F comprises two retaining layers 123F which are respectively integrally extended from the two body layers 111F. In other words, in this preferred embodiment, a single sheet is used for forming a body layer 111F and a retaining layer 123F. More specifically, a single integral sheet is folded to define the body layer 111F and the retaining layer 123F, and then each retaining layer 123F is sealed to the corresponding body layer 111F at at least a lateral side thereof by a joint seam 1231F which is an intermittent seam that defines a retaining slot 1232F between the retaining layer 123F and the corresponding body layer 111F, then two integral sheets are overlapped to position the two retaining layers 123F between the two body layers 111F, and then the two integral sheets are connected by a bottom sealing seam 114F and two side sealing seams 115F.

Figure 11C:
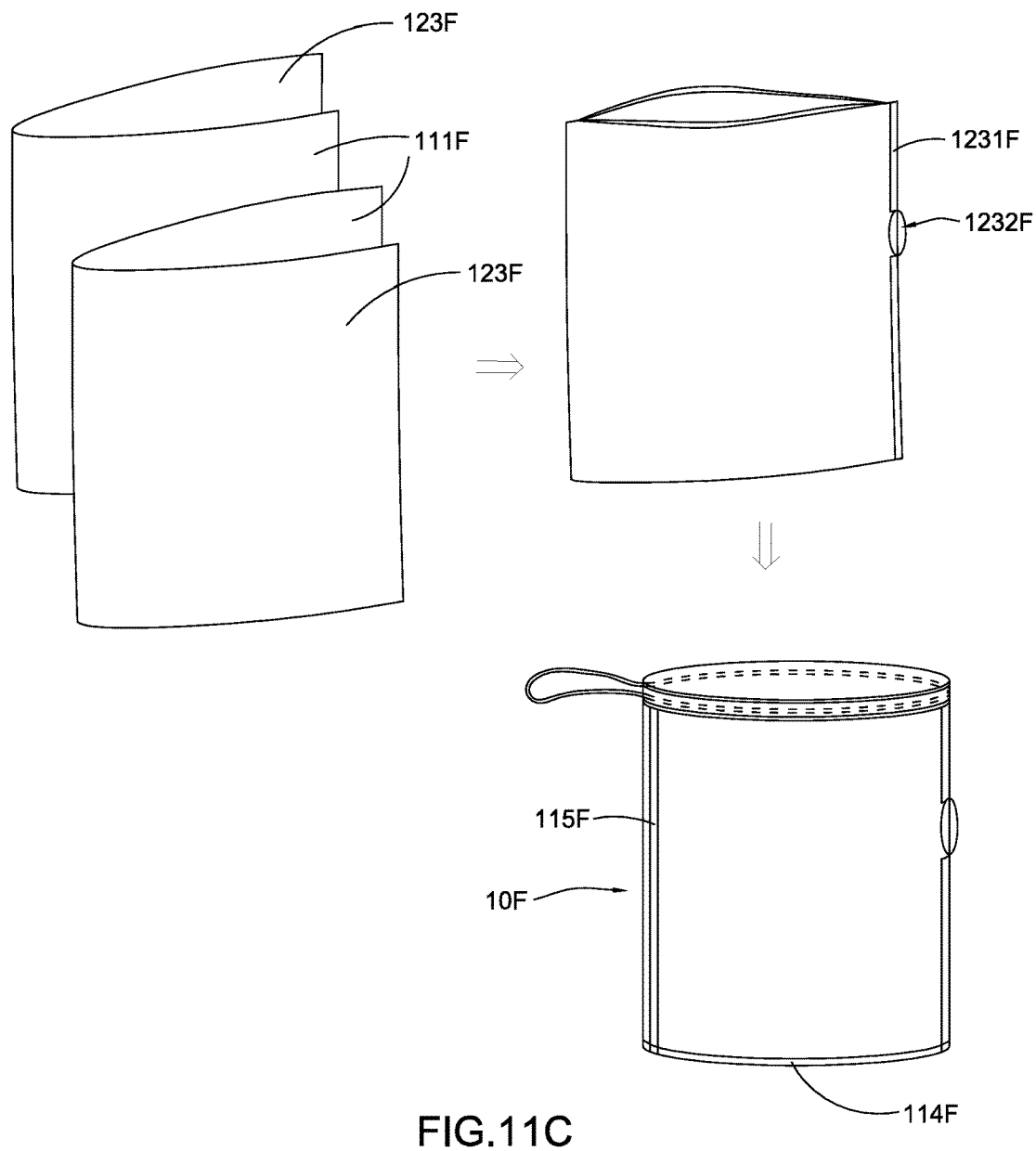
FIG. 11C is a schematic view illustrating a manufacturing process of the waste collector bag according to the alternative mode of the above second preferred embodiment of the present invention.
Figure 12:
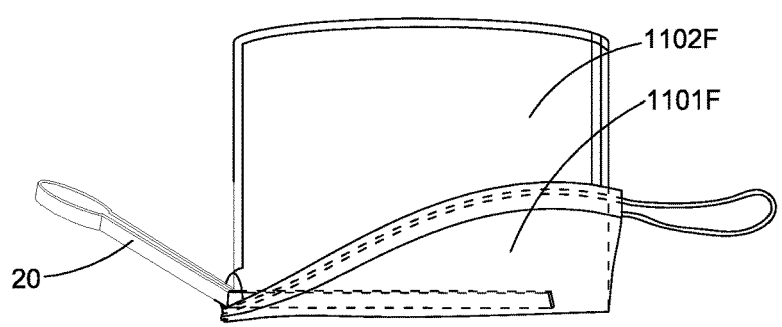
FIG. 12 is a sectional view of the pet waste collector bag according to the alternative mode of the above second preferred embodiment of the present invention, illustrating the bag body reversibly flipped inside out from an opening to form the waste collecting cavity.
Figure 18A:
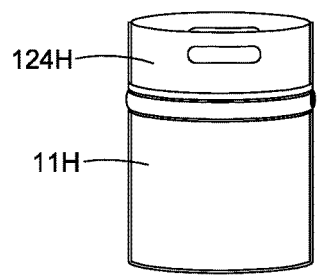
FIGS. 18A, 18B, 18C, 18D, 18E, 18F and 18G illustrate a method for picking up and collecting the pet waste by the pet waste collector bag according to the another alternative mode of the above third preferred embodiment of the present invention.
Figure 18B:
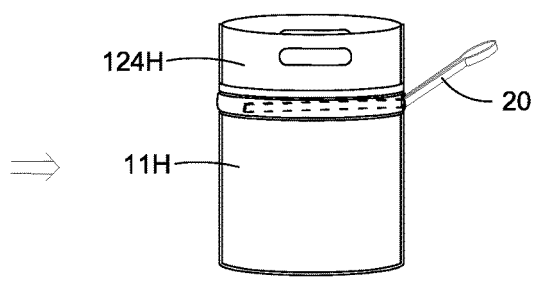
Figure 18C:
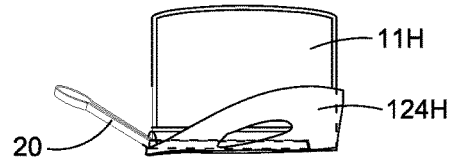
Figure 18D:
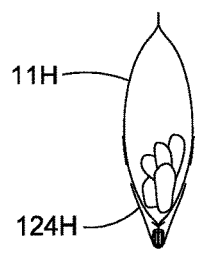
Figure 18E:
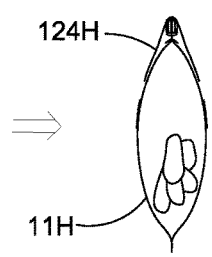
Figure 18F:
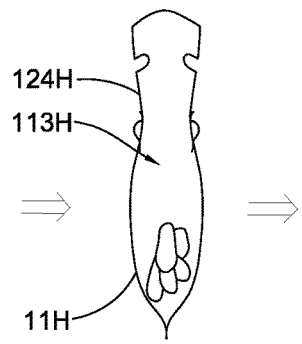
Figure 18G:
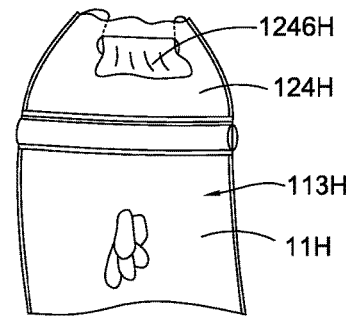

Referring to FIG. 11C of the drawings, for manufacturing the pet waste collector bag of this embodiment, prepare two sheets and fold each of the two sheets to form the body layer 111E and the retaining layer 123E, and then the joint seam 1231F is applied to form each retaining slot 1232F between each corresponding retaining layer 123F and the body layer 11F, and finally the bottom sealing seam 114F and the side sealing seam 115F can be applied for forming the pet waste collector bag.

Referring to FIG. 13A to FIG. 15G of the drawings, a pet waste collector bag 10G according to another alternative mode of the above second preferred embodiment of the present invention is illustrated. Similarly, the pet waste collector bag 10G comprises a bag body 11G which comprises two body layers 111G, and a retaining arrangement 12G for positioning the two scraper arms 21 for picking up the pet waste.

More specifically, the bag body 11G comprises the two body layers 111G which are overlappedly with each other while the body layers 111G can be formed by two individual sheets affixed with each other edge-to-edge, or can be formed by one single sheet overlappedly folded in half. The retaining arrangement 12G comprises two retaining layers 123G attached to the two body layers 111G adapted for positioning the two scraper arms 21 of the scraper tool 20. More specifically, the retaining arrangement 12G of this preferred embodiment comprises a first portion 1237G which is extended at an outer side of the bag body 11G, and a second portion 1238G which is extended at an inner side of the bag body 11G. The retaining layers 123G of this preferred embodiment, can be formed by two individual sheets affixed with each other edge-to-edge, or can be formed by one single sheet overlappedly folded in half, has a top opening 112G and defines a waste storing cavity 113G. Alternatively, the second portion 1238G of the the retaining arrangement 12G may be formed at an outer side of the bag body 11G.

In addition, each retaining layer 123G is sealed to the corresponding body layer 111G at at least a lateral side thereof by a joint seam 1231G which is an intermittent seam that defines a retaining slot 1232G between the second portion 1238G of the retaining layer 123G and the corresponding body layer 111G, so that when the first portion 1237G of the retaining layers 123G is flipped to expose the retaining slots 1232G, a waste collecting cavity 1103G having a collecting opening 1104G is formed by the second portion 1238G of the retaining layers 123G of the retaining arrangement 12G, and each of the two scraper arms 21 of the scraper tool 20 can be inserted through the retaining slot 1232G to a position between the retaining layer 123G and the corresponding body layer 111G, and then the two scraper arms 21 of the scraper tool 20 can be operated for scraping the pet waste into the waste collecting cavity 1103G.

In this embodiment, the waste storing cavity 113G having the top opening 112G is formed by the two retaining layers 123G. Top edges of the retaining layers 123G are remained unsealed to form the top opening 112G, bottom edges of the body layers 111G and bottom edges of the retaining layers 123G are sealed by a bottom sealing seam 114G, side edges at two sides of the body layers 111G are respectively sealed by the joint seams 1231G.

Each retaining layer 123G may be connected to the corresponding body layer 111G by two retaining seams 1235G, so that an inner retaining groove 1236G having the retaining slot 1232G is formed, so that when the first portion 1237G of the two retaining layers 123G is flipped inside out to expose the retaining slots 1232G, each of the two scraper arms 21 of the scraper tool 20 can be inserted into the inner retaining groove 1236G through the retaining slot 1232G, and then the two scraper arms 21 of the scraper tool 20 can be operated for picking up the pet waste.

Referring to FIG. 15A to FIG. 15G of the drawing, this embodiment of the present invention further provides a method for collecting the pet waste by the pet waste collector bag 10G, and the method comprises the following steps.

(I) Overlap the first portion 1237G of the retaining layers 123G of the retaining arrangement 12G on the bag body 11G to form a waste collecting cavity which is formed by the second portion 1238G of the retaining layers 123G of the retaining arrangement 12G. Accordingly, the first portion 1237G of the retaining layers 123G may be flipped inside out from the top opening 112G to fold the first portion 1237G of the retaining layers 123G with the bag body 11G, and the retaining slots 1232G can be exposed.

(II) Receive the scraper arms 21 of the scraper tool 20 in the inner retaining grooves 1236G for scraping the pet waste into the waste collecting cavity 1103G.

(III) Define the waste storing cavity 113G when the first portion 1237G of the two retaining layers 123G is flipped to a position unfolded with the bag body 11G and close the top opening 112G for storing the pet waste in the waste storing cavity 113G of the bag body 11G.

Referring to FIG. 16A to FIG. 18G of the drawings, a pet waste collector bag 10H according to a third preferred embodiment of the present invention is illustrated. The pet waste collector bag 10H comprises a bag body 11H which comprises two body layers 111H defining a waste collecting cavity 1103H for storing the pet waste, and a retaining arrangement 12H for positioning the two scraper arms 21 for picking up the pet waste.

The retaining arrangement 12H comprises two extending retaining layers 124H attached to the two body layers 111H adapted for positioning the two scraper arms 21 of the scraper tool 20. More specifically, the two extending retaining layers 124H the retaining arrangement 12H of this preferred embodiment comprises a bottom edge 1241H which is attached and connected to a top edge 1111H of the bag body 11H by two retention seams 1242H while top edges of the extending retaining layers 124H are unsealed to form a top opening 112H, at least two retention holes 1243H are formed at a lateral side of the retaining layers 124H, retention grooves 1244H can be formed between the two retention seams 1242H. According, the rest body portion of the retaining arrangement 12H above the bottom edge 1241H can be extend at the outer side of the bag body 11H and define an upper cavity 1245H which can be communicated to the waste collecting cavity 1103H of the bag body 11H to form a waste storing cavity 113H.

Accordingly, when extending retaining layers 124H of the retaining arrangement 12H are flipped inside out to a position overlapping with the bag body 11H, the waste collecting cavity 1103H with a collecting opening 1104H is exposed and the retention slots 1243H are also exposed, so that the scraper arms 21 can be respectively inserted into the retention grooves 1244H through the retention slots 1243H for picking up the pet waste into the waste collecting cavity 1103H of the bag body 11H, as shown in FIG. 17 of the drawings.

In addition, in this preferred embodiment, one of the retaining layer 124H is formed with an engaging tongue 1246H while the other retaining layer 14H has an engaging slot 1247H, after the waste picking operation, the extending retaining layers 124H of the retaining arrangement 12H are flipped back to a position which is unfolded with the bag body 11H, the engaging tongue 1246H can be inserted through the engaging slot 1247H for closing the top opening 112H.

Referring to FIG. 18A to FIG. 18G of the drawing, this embodiment of the present invention further provides a method for collecting the pet waste by the pet waste collector bag 10H, and the method comprises the following steps.

(i) Expose the two retention slots 1243H when the extending retaining layers 124H of the retaining arrangement 12H is folded to overlap at an outer side of the bag body 11H.

(ii) Position the scraper arms 21 of the scraper tool 20 between the extending retaining layers 124H and the body layers 111H of the bag body 11H when the scraper arms 21 are respectively inserted through the two retention slots 1243H into the two retention grooves 1244H for scraping the pet waste into the waste collecting cavity 1103H of the bag body 11H.

(iii) Coplane the two retaining layers 123H of the retaining arrangement 12H with the body layers 111H of the bag body 11H respectively when the retaining arrangement 12H is flipped to a position unfolded with the bag body 11H and close the top opening 112H for storing the pet waste in the bag body 11H.

Alternatively, the two retention slots 1243H may be formed at the outer side of the extending retaining layers 124H, so that the scraper arms 21 of the scraper tool 20 may be inserted into the two retention grooves 1244H before the extending retaining layers 124H of the retaining arrangement 12H is folded to overlap at the outer side of the bag body 11H.

Figure 19A:
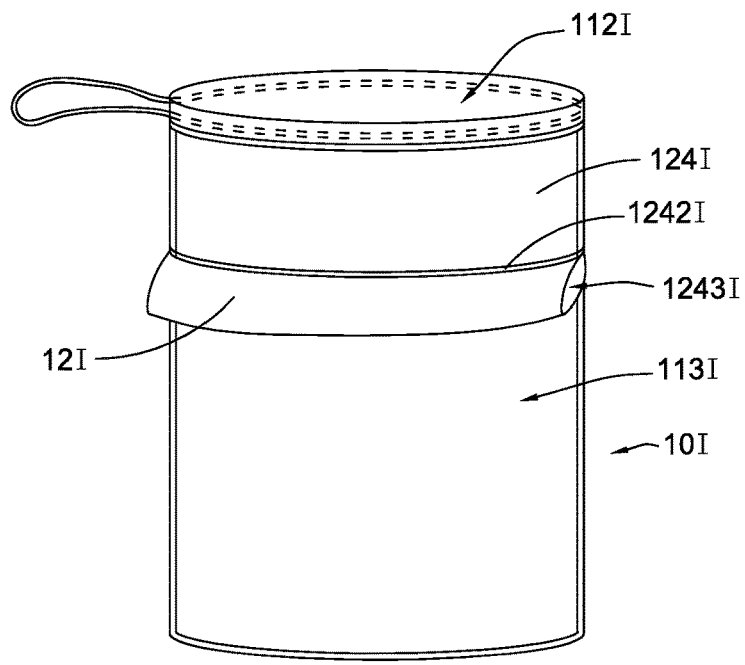
FIG. 19A is a perspective view of a pet waste collector bag according to an alternative mode of the above third preferred embodiment of the present invention.
Figure 19B:
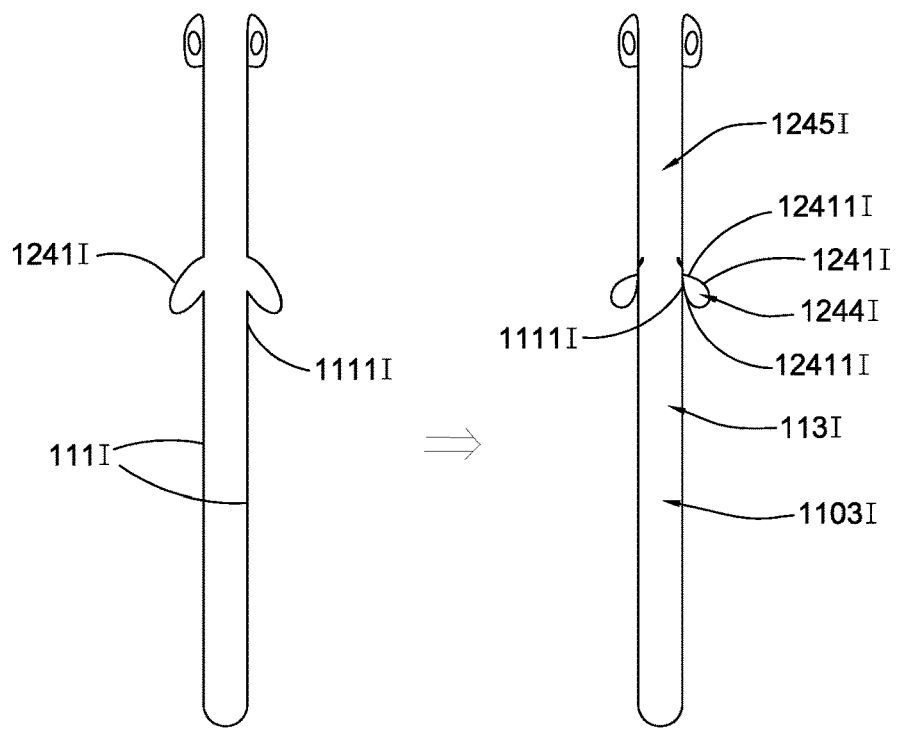
FIG. 19B is a schematic view illustrating a manufacturing process of the waste collector bag according to the alternative mode of the above third preferred embodiment of the present invention.
Figure 20:
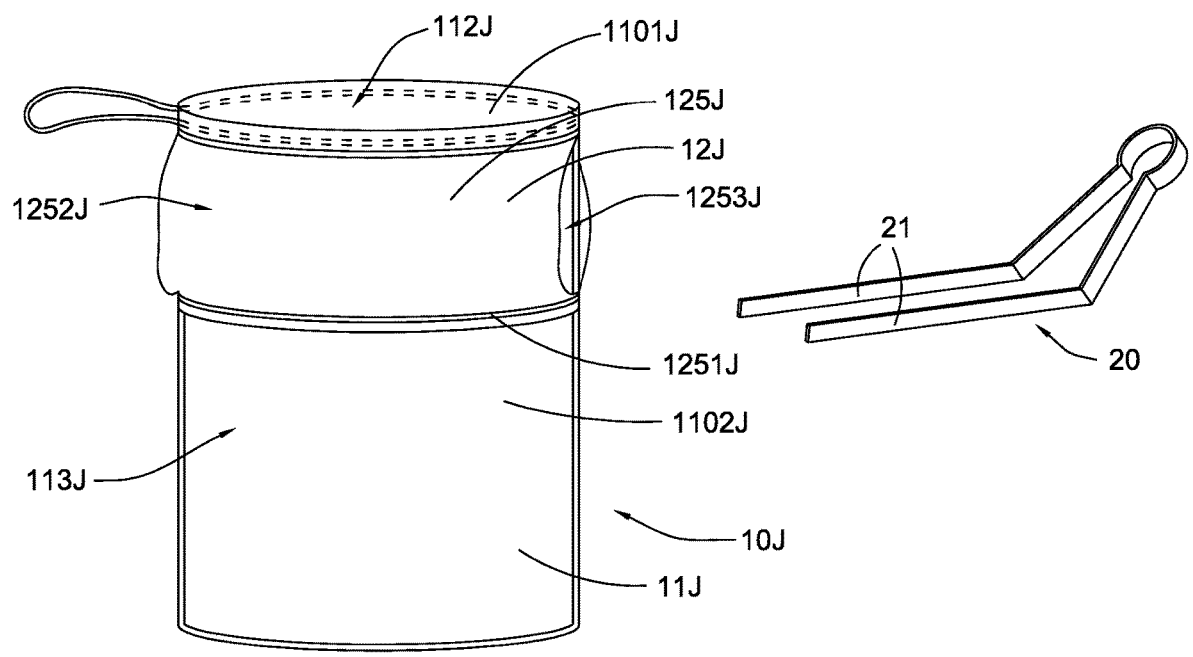
FIG. 20 is a perspective view of a pet waste collector bag according to a fourth preferred embodiment of the present invention.
Figure 21:
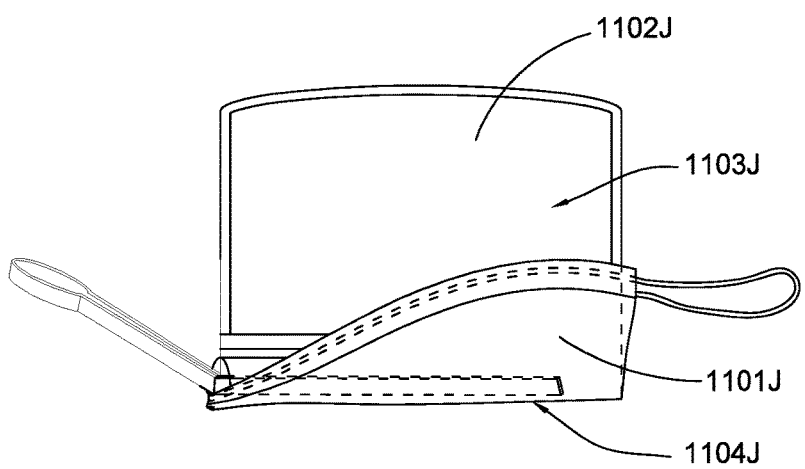
FIG. 21 is a sectional view of the pet waste collector bag according to the above fourth preferred embodiment of the present invention, illustrating the bag body reversibly flipped inside out from an opening to form the waste collecting cavity.
Figure 23:
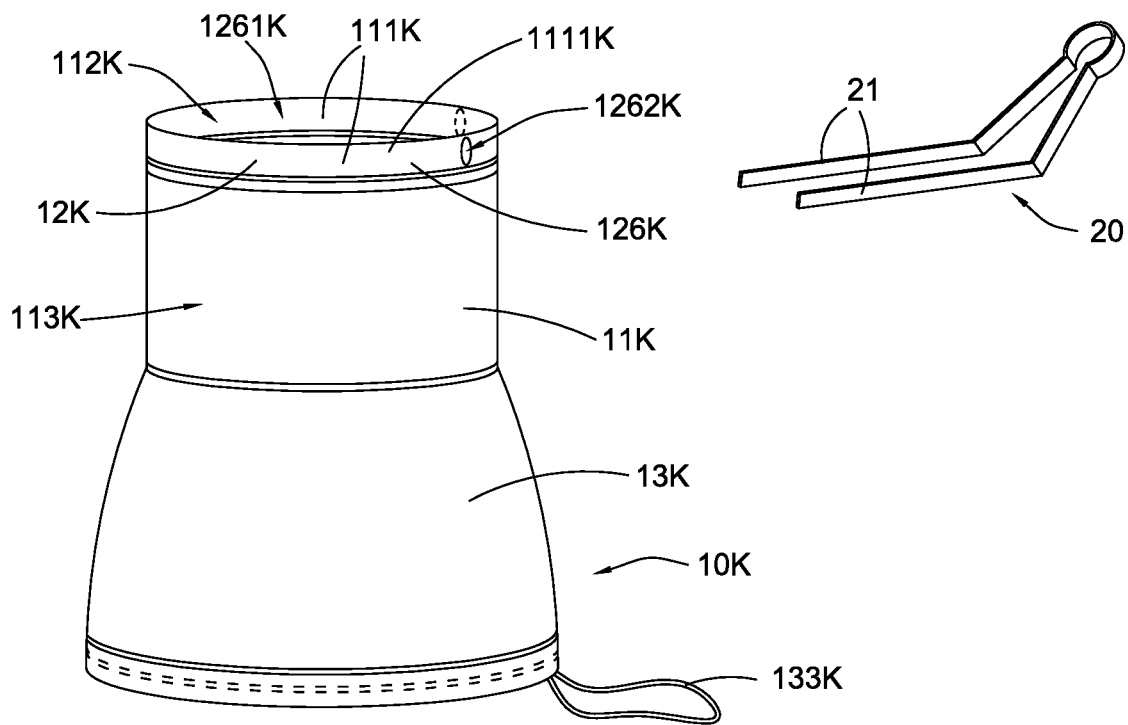
FIG. 23 is a perspective view of a pet waste collector bag according to a fifth preferred embodiment of the present invention.

Referring to FIG. 19A and FIG. 19B of the drawings, a pet waste collector bag 10I according to an alternative mode of the above third preferred embodiment of the present invention is illustrated. Similarly, the pet waste collector bag 10I comprises a bag body 11I which comprises two body layers 111I defining a waste collecting cavity 1103I for storing the pet waste, and a retaining arrangement 12I for positioning the two scraper arms 21 for picking up the pet waste.

The retaining arrangement 12I comprises two extending retaining layers 124I which are integrally and respectively extended from the two body layers 111I adapted for positioning the two scraper arms 21 of the scraper tool 20. Both of the two extending retaining layers 124I and the two body layers 111I can be two independent layers are an integral layer which is folded in half.

More specifically, the two extending retaining layers 124I of the retaining arrangement 12I of this preferred embodiment comprises a bottom edge 1241I which is folded into two half portions 12411I and connected to a top edge 1111I of the bag body 11I by a single retention seam 1242I while top edges of the extending retaining layers 124I are unsealed to form a top opening 112I, at least two retention holes 1243I are formed at a lateral side of the retaining layers 124I, retention grooves 1244I can be formed between the two half portions 12411I of the bottom edge 1241I of the retaining arrangement 12I. According, the rest body portion of the retaining arrangement 12I above the bottom edge 1241I can be extend at the outer side of the bag body 11I and define an upper cavity 1245I which can be communicated to the waste collecting cavity 1103I of the bag body 11I to form a waste storing cavity 113I.

Referring to FIG. 20 to FIG. 22G of the drawings, a pet waste collector bag 10J according to a fourth preferred embodiment of the present invention is illustrated. In this embodiment, the pet waste collector bag 10J comprises a bag body 11J which comprises two body layers 111J defining a waste storing cavity 113J having a top opening 112J for storing the pet waste, and a retaining arrangement 12J for positioning the two scraper arms 21 for picking up the pet waste.

The retaining arrangement 12J comprises two folding retaining layers 125J which are integrally and respectively extended from the two body layers 111J adapted for positioning the two scraper arms 21 of the scraper tool 20. Both of the two folding retaining layers 125J and the two body layers 111J can be two independent layers are an integral layer which is folded in half.

More specifically, the two folding retaining layers 125J of the retaining arrangement 12J of this preferred embodiment is folded with a first portion 1101J of the bag portion 11J and connected to the first portion 1101J of the bag portion 11J by a positioning seam 1251J defining two positioning groove 1252J each has at least a positioning hole 1253J.

The bag body 11J can be flipped inside out by folding the first bag portion 1101J with the folding retaining layers 125J towards a second bag portion 1102J to expose the two positioning holes 1253J. Then, the two scraper arms 21 can be respectively inserted into the two positioning grooves 1251J for scraping the pet waste into the bag body 11J. More specifically, when the first bag portion 1101J with the folding retaining layers 125J is flipped to be overlapped with the second bag portion 1102J, the second bag portion 1102J actually forms a waste collecting cavity 1103J with a collecting opening 1104J, so that the pet waste can be scraped into the waste collecting cavity 1103J through the collecting opening 1104J under the operation of the two scraper arms 21 of the scraper tool 20. In addition, the two scraping arms 21 can be retained along the positioning seam 1251J for picking up the pet waste. After the first bag portion 1101J with the folding retaining layers 125J is flipped back, the bag body 11J with the first bag portion 1101J and the second bag portion 1102J form the waste storing cavity 113J again.

Referring to FIG. 23 to FIG. 25E of the drawings, a pet waste collector bag 10K according to a fifth preferred embodiment of the present invention is illustrated. The pet waste collector bag 10K comprises a bag body 11K which comprises two body layers 111K having a top opening 112K and defining a waste storing cavity 113K communicated to the top opening 112K for storing the pet waste, and a retaining arrangement 12K for positioning the two scraper arms 21 so as to scrape the pet waste into the waste storing cavity 113K of the bag body 11K, and a outer bag 13K which is connected at an outer side of the bag body 11K.

More specifically, the bag body 11K comprises the two body layers 111K which are overlappedly with each other to form the waste storing cavity 113K between the two body layers 111K. The body layers 111K can be formed by two individual sheets affixed with each other edge-to-edge, or can be formed by one single sheet overlappedly folded in half. In this preferred embodiment, the retaining arrangement 12K comprises two holding members 126K attached to top edges 1111K of the two body layers 111K at an outer side thereof adapted for positioning the two scraper arms 21 of the scraper tool 20.

Similar to the above first preferred embodiment, the two holding members 126K can be two pockets, or are integrally formed as an integral pocket, or at least two retaining strips, so that during the waste picking operation, each the two scraper arms 21 can be retained between the holding member 126K and the corresponding body layer 111K. In this embodiment, each of the holding members 126K can be embodied as a holding pocket defining a holding groove

1261K having a holding hole 1262K, so that each of the two scraper arms 21 of the scraper tool 20 can be inserted into the holding groove 1261K through the holding hole 1262K and retained between the holding pocket and the corresponding body layer 111K, and then the two scraper arms 21 of the scraper tool 20 can be operated for scraping the pet waste into the waste storing cavity 113K of the bag body 11K.

Figure 24:
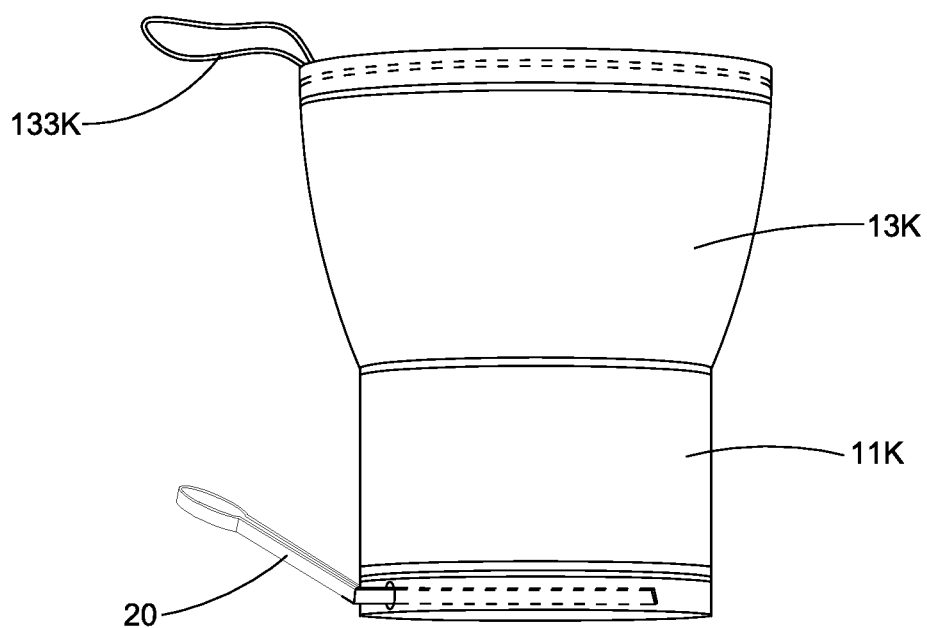
FIG. 24 is a sectional view of the pet waste collector bag according to the above fifth preferred embodiment of the present invention, illustrating the bag body reversibly flipped inside out from an opening to form the waste collecting cavity.

The outer bag 13K, which is connected to the bag body 11K at a bottom side thereof, has a receiving cavity 131K with an opening 132K. A drawing string 133K can be provided around the opening 132K for closing the opening 132K. It is worth mentioning that a height H1 of the outer bag 13K is larger than a height of the bag body 11K. When scraping the pet waste, the outer bag 13K can be flipped to expose the bag body 11K, as shown in FIG. 24 of the drawings, and then the bag body 11K with the retaining arrangement 12K can be used for picking up the pet waste under operation of the scraper arms 21. After the pet waste has been scraped into the waste storing cavity 113K of the bag body 11K, the outer bag 13K can be folded back to cover the bag body 11K. Since the size of the outer bag 13K is larger than the bag body 11K, the bag body 11K can be totally covered by the outer bag 13K, so that the hands of the pet owner will not have contact with the pet waste because the opening 132K of the outer bag 13K is kept clean during the whole waste picking operation.

Referring to FIG. 25A to FIG. 25E of the drawings, this preferred embodiment provides a method for collecting the pet waste by the pet waste collector bag 10K, and the method comprises the following steps.

(α) Uncover the bag body 11K at an outside of the outer bag 13K. Accordingly, the outer bag 13K can be flipped away from the top opening 112K of the bag body 11K to expose the bag body 11K.

(β) Retain the scraper arms 21 of the scraper tool 20 by the retaining arrangement 12K connected to the bag body 11K for scraping the pet waste into the waste storing cavity 113K of the bag body 11K.

(γ) Cover the bag body 11K within the outer bag 13K and Close an opening of the outer bag 13K for storing the pet waste in the storing cavity 113K of the bag body 11K.

Referring FIG. 26 to FIG. 27C of the drawings, a pet waste collector bag 10L according to a sixth preferred embodiment of the present invention is illustrated. The pet waste collector bag 10L comprises a bag body 11L which is a piece of sheet 14L, and a retaining arrangement 12L for positioning the two scraper arms 21 so as to pick up the pet waste.

Accordingly, the retaining arrangement 12L comprises two holding members 126L attached to the piece of sheet 14L of the bag body 11L adapted for positioning the two scraper arms 21 of the scraper tool 20. Similar to the above fifth preferred embodiment, the two holding members 126L can be two pockets, or are integrally formed as an integral pocket, or at least two retaining strips, so that during the waste picking operation, each of the two scraper arms 21 can be retained between the holding member 126L and the corresponding bag body 11L. In this embodiment, each of the holding members 126L can be embodied as a holding strip defining a holding hole 1261L, so that each of the two scraper arms 21 of the scraper tool 20 can be inserted through the holding hole 1261L, and then the two scraper arms 21 of the scraper tool 20 can be operated for picking up the pet waste.

It is worth mentioning that a shape of the piece of sheet 11L is not limited, the piece of sheet 14L of the bag body 11L in this embodiment can have a round shape. Each of the holding members 126L are arranged at a position away from a peripheral edge 141L of the piece of sheet 14L. When picking up the pet waste, the peripheral edge 141L of the piece of sheet 14L is upwardly folded, and then each of the two scraper arms 21 of the scraper tool 20 can be inserted into the holding groove 1261L for picking up the pet waste. Then the piece of sheet 14L storing the pet waste can be lifted up with the holding members 126L facing downward, and then a drawstring 142L around the peripheral edge 141L can be pulled so that the piece of sheet 14L can form a bag which wraps the pet waste therewithin. In addition, a folding line 143L may be formed at the piece of sheet 14L, so that the peripheral edge 141L can be easy to fold along the folding line 143L.

Since the scraper arms 21 are above the piece of sheet 14L when collecting the pet waste, the scraper arms 21 will not have contact with the pet waste. And the peripheral edge 141L also does not contact the pet waste during the waste scraping operation, so that when the pet owner operates on the drawstring 142L for wrapping the pet waste, the hands of the pet owner will not get dirty because the hands of the pet owner will not contact the pet waste.

Referring to FIG. 27A to FIG. 27C of the drawings, this preferred embodiment provides a method for collecting the pet waste by the pet waste collector bag 10L, and the method comprises the following steps.

(1) Arrange the peripheral edge 141L of the piece of sheet 14L of the bag body 1L at a position being folded towards and close to the retaining arrangement 12K.

(2) Retain the scraper arms 21 of the scraper tool 20 by the retaining arrangement 12K connected to the bag body 11L for picking up the pet waste.

(3) Wrap the pet waste by the piece of sheet 14 when the peripheral edge 141L is folded to a position being moved away from the retaining arrangement 12K and is tie-closed by the drawstring 143L.

Referring to FIGS. 28 to 29C of the drawings, a pet waste collector bag 10M according to an alternative mode of the above sixth preferred embodiment of the present invention is illustrated. The pet waste collector bag 10M of this embodiment comprises a bag body 11M which is a piece of sheet 14M, a wrapping body 15M which is connected to the bag body 11M at a center portion thereof, and a retaining arrangement 12M for positioning the two scraper arms 21 so as to pick up the pet waste.

Similarly, the retaining arrangement 12M comprises two holding members 126M attached to the piece of sheet 14M of the bag body 11M adapted for positioning the two scraper arms 21 of the scraper tool 20, and each of the holding members 126M can be a pockets, or comprising one or more retaining strips. In addition, each holding member 126M of this preferred embodiment can be provided around a peripheral edge 141M of the piece of sheet 14M.

An area of the wrapping body 15M, which is also a sheet, is large than an area of the piece of sheet 14M, so that after the scraper arms 21 are retained in the retaining arrangement 12M for picking up the pet waste, the wrapping body 15M is covered on the piece of sheet 14M and operation on a drawstring 151M can tie-close a peripheral edge of the wrapping body 15M, so that the piece of sheet 14M form a bag for storing the pet waste.

One skilled in the art will understand that the embodiments of the present invention as shown in the drawings and described above are exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A pet waste collector bag for coupling with two scraper arms for picking up the pet waste, comprising:
   a bag body; and
   a retaining arrangement coupled to said bag body for retaining the two scraper arms so as to scrape the pet waste into said bag body, wherein said bag body comprises two body layers overlapped with each other defining a waste storing cavity having a top opening, wherein said retaining arrangement comprises two pockets attached to said two body layers respectively, wherein each of said two pockets defines a retaining groove having an inserting hole, and said two pockets are arranged at a position dividing said bag body into a first bag portion and a second bag portion, wherein when said first bag portion is flipped to be overlapped on said second bag portion, each of the two scraper arms is capable of being inserted into said retaining groove through said inserting hole.

2. The pet waste collector bag, as recited in claim 1, wherein said two pockets are respectively attached to said two body layers at an inner side of said bag body, wherein said first bag portion is flipped to be overlapped on said second bag portion to expose said two pockets adapted for retaining the two scraper arms.

3. The pet waste collector bag, as recited in claim 1, wherein said two pockets are respectively attached to said two body layers at an outer side of said bag body.

4. A pet waste collector bag for coupling with two scraper arms for picking up the pet waste, comprising:
   a bag body; and
   a retaining arrangement coupled to said bag body for retaining the two scraper arms so as to scrape the pet waste into said bag body, wherein said bag body comprises two body layers overlapped with each other defining a waste storing cavity, wherein said bag body has a top edge defining a top opening communicated to said waste storing cavity, wherein said retaining arrangement comprises two pockets attached to said two body layers respectively, wherein each of said two pockets, which defines a retaining groove having an inserting hole, is inclined extended at an outer side of said bag body in such a manner that an end thereof is at a position adjacent to said top edge of said bag body while an opposite end thereof is away from said top edge, dividing said bag body into a first bag portion and a second bag portion, wherein said first bag portion is adapted for being flipped to be overlapped on said second bag portion for scraping the pet waste into said second bag portion under operation of the two scraper arms each is inserted into said retaining groove through said inserting hole.

5. A pet waste collector bag for coupling with two scraper arms for picking up the pet waste, comprising:
   a bag body; and
   a retaining arrangement coupled to said bag body for retaining the two scraper arms so as to scrape the pet waste into said bag body, wherein said bag body comprises two body layers overlapped with each other defining a waste storing cavity having a top opening, wherein said retaining arrangement comprises at least two retaining strips attached to said two body layers, wherein each of said at least two retaining strips defines a retaining hole, and said at least two retaining strips are arranged at a position dividing said bag body into a first bag portion and a second bag portion, wherein said first bag portion is capable of being flipped to be overlapped on said second bag portion, wherein each of the two scraper arms being inserted through said retaining hole is capable of being retained in position by said retaining strips for scraping the pet waste into said second bag portion.

6. The pet waste collector bag, as recited in claim 5, wherein said retaining arrangement further comprises a button member which mounts each of said retaining strips to said corresponding body layer.

7. A pet waste collector bag for coupling with two scraper arms for picking up the pet waste, comprising:
   a bag body; and
   a retaining arrangement coupled to said bag body for retaining the two scraper arms so as to scrape the pet waste into said bag body, wherein said bag body comprises two body layers overlapped with each other, wherein said retaining arrangement comprises two retaining layers, wherein said pet waste collector bag further comprises a joint seam at a lateral side thereof, wherein each of said two retaining layers is connected to said corresponding body layer through said joint seam which is an intermittent seam defining a retaining slot, wherein said retaining slot is arranged at position dividing said aid bag body into a first bag portion and a second bag portion and dividing said retaining layers into an upper portion and a lower portion, wherein when said first bag portion of said bag body and said upper portion of said retaining layers are flipped to be overlapped on said second bag portion of said bag body, each of the two scraper arms is capable of being inserted through said retaining slot so as to be retained between said retaining layer and said body layer for scraping the pet waste.

8. The pet waste collector bag, as recited in claim 7, wherein each of said two retaining layers is integrally extended from said corresponding body layer to form an integral sheet which is folded to form said retaining layer and said body layer.

9. The pet waste collector bag, as recited in claim 7, wherein said retaining arrangement further comprises two retaining seams connecting each of said retaining layer with said corresponding body layer, wherein an inner retaining groove which is communicated with said retaining slot is defined between said two retaining seams.

10. A pet waste collector bag for coupling with two scraper arms for picking up the pet waste, comprising:
   a bag body; and
   a retaining arrangement coupled to said bag body for retaining the two scraper arms so as to scrape the pet waste into said bag body, wherein said bag body comprises two body layers overlapped with each other, wherein said retaining arrangement comprises two retaining layers having a first portion extended out of said two body layers and a second portion overlapped with said two body layers, wherein said pet waste collector bag further comprises a joint seam at a lateral side thereof, wherein each of said two retaining layers is connected to said corresponding body layer through said joint seam which is an intermittent seam defining a retaining slot, wherein when said first portion of said two retaining layers is flipped to be overlapped on said bag body, each of the two scraper arms being inserted through said retaining slot is capable of being retained between said retaining layer and said body layer for picking up the pet waste.

11. A pet waste collector bag for coupling with two scraper arms for picking up the pet waste, comprising:
a bag body; and
a retaining arrangement coupled to said bag body for retaining the two scraper arms so as to scrape the pet waste into said bag body, wherein said bag body comprises two body layers overlapped with each other, wherein said retaining arrangement comprises two extending retaining layers each having a bottom edge and two retention seams connecting said bottom edge of each of said two extending retaining layers to said two body layers respectively, wherein two retention grooves each having a retention slot are formed between said two retention seams, wherein when said two retaining layers are flipped to be overlapped on said bag body, each of the two scraper arms being inserted through said retention slot is capable of being retained in said retention groove for scraping the pet waste into said bag body.

12. A pet waste collector bag for coupling with two scraper arms for picking up the pet waste, comprising:
a bag body; and
a retaining arrangement coupled to said bag body for retaining the two scraper arms so as to scrape the pet waste into said bag body, wherein said bag body comprises two body layers overlapped with each other, wherein said retaining arrangement comprises two extending retaining layers integrally extended from said two body layers respectively, wherein each of said two extending retaining layers has a bottom edge which is folded into two half portions and a retention seam connecting said bottom edge of each of said two extending retaining layers to said two body layers respectively, wherein two retention grooves each having a retention slot are formed between said two half portions of said bottom edge of each of said two extending retaining layers, wherein when said two retaining layers are flipped to be overlapped on said bag body, each of the two scraper arms being inserted through said retention slot is capable of being retained in said retention groove for scraping the pet waste into said bag body.

13. A pet waste collector bag for coupling with two scraper arms for picking up the pet waste, comprising:
a bag body; and
a retaining arrangement coupled to said bag body for retaining the two scraper arms so as to scrape the pet waste into said bag body, wherein said bag body comprises two body layers overlapped with each other, wherein said retaining arrangement comprises two folding extending layers which are integrally extended from and folded with said two body layers respectively, and a positioning seam connecting each of said two folding extending layers to said corresponding body layer and defining a positioning slot with a positioning hole, wherein said positioning seam is provided at a position dividing said aid bag body into a first bag portion and a second bag portion, wherein when said first bag portion of said bag body and said folding extending layers are flipped to be overlapped on said second bag portion of said bag body to expose said positioning hole, each of the two scraper arms is capable of being inserted through said positioning hole so as to be retained in said positioning groove for scraping the pet waste into said second bag portion of said bag body.

14. A pet waste collector bag for coupling with two scraper arms for picking up the pet waste, comprising:
a bag body;
a retaining arrangement coupled to said bag body for retaining the two scraper arms so as to scrape the pet waste into said bag body; and
an outer bag connected to said bag body at a bottom side thereof, wherein said bag body has a top edge and said retaining arrangement comprises two holding members connected to said top edge of said bag body, wherein each of said two holding members has a holding hole, when said outer bag is flipped to uncover said bag body, each of the two scraper arms is capable of being inserted through said holding hole so as to be retained in position by said corresponding holding member, wherein a height of said outer bag is larger than a height of said bag body to allow said outer bag to be flipped back to cover said bag body after the pet waste is scraped into said bag body.

15. The pet waste collector bag, as recited in claim 14, wherein each of said two holding members is one of a holding pocket having said holding hole and a holding strip defining said holding hole.

16. A pet waste collector bag for coupling with two scraper arms for picking up the pet waste, comprising:
a bag body; and
a retaining arrangement coupled to said bag body for retaining the two scraper arms so as to scrape the pet waste into said bag body, wherein said bag body is a piece of sheet having a peripheral edge, and a wrapping body which is a sheet connected to said bag body, wherein said retaining arrangement comprises two holding members connected to said bag body at a position along peripheral edge of said bag body, wherein each of said holding members has a holding hole for each of said two scraper arms to penetrate therethrough for picking up the pet waste, wherein an area of said wrapping body is larger than an area of said bag body so as to allow said wrapping body to completely wrap said bag body when the pet waste is scraped into said bag body.

\* \* \* \* \*